United States Patent
Venkatachary et al.

(10) Patent No.: US 7,805,393 B1
(45) Date of Patent: Sep. 28, 2010

(54) ASSIGNING ENCODED STATE VALUES TO A SEARCH TREE ACCORDING TO FAILURE CHAINS

(75) Inventors: Srinivasan Venkatachary, Sunnyvale, CA (US); Pankaj Gupta, Palo Alto, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 707 days.

(21) Appl. No.: 11/830,397

(22) Filed: Jul. 30, 2007

(51) Int. Cl.
*G06N 5/00* (2006.01)

(52) U.S. Cl. .......................................... 706/48; 707/2

(58) Field of Classification Search .................. 706/48, 706/45; 707/2
See application file for complete search history.

(56) References Cited

U.S. PATENT DOCUMENTS

| | | | |
|---|---|---|---|
| 5,299,206 A | 3/1994 | Beaverson et al. | |
| 6,856,981 B2 | 2/2005 | Wyschogrod et al. | |
| 7,440,304 B1 | 10/2008 | Raj | |
| 7,610,269 B1 * | 10/2009 | Gupta et al. | 1/1 |
| 2003/0051043 A1 | 3/2003 | Wyschogrod et al. | |
| 2003/0065800 A1 | 4/2003 | Wyschogrod et al. | |
| 2005/0114306 A1 | 5/2005 | Shu et al. | |
| 2007/0192286 A1 | 8/2007 | Norton et al. | |

OTHER PUBLICATIONS

Lin, A Logic-Based Approach to Automated System Management, HP Labs Technical Reports, Tech Report: HPL-98-19, pp. 1-9.*
"Efficient String Matching: An Aid to Bibliograpic Search," Alfred V. Aho, Margaret J. Corasick; Bell Laboratories; Jun. 1975; pp. 333 thru 340.
"High Speed Pattern Matching for Network IDS/IPS", Mansoor Alicherry, M. Muthuprasanna, Vijay Kumar; IEEE Report Sep. 2006; pp. 187 thru 196.

* cited by examiner

Primary Examiner—Wilbert L Starks, Jr.
(74) Attorney, Agent, or Firm—Mahamedi Paradice Kreisman LLP; William L. Paradice, III

(57) ABSTRACT

A method for assigning state codes to states of a state diagram embodying a plurality of signatures to be searched for in an input string of characters re-organizes the states of a search tree embodying the signatures to construct a failure tree in which the states are organized in levels according to a number of failure transitions between each state and the root node of the search tree.

32 Claims, 16 Drawing Sheets

| TCAM entries | | SRAM entries | |
|---|---|---|---|
| current state | character | next state | result |
| 0 | r | 1 | 0 |
| 0 | d | 8 | 0 |
| 0 | n | 14 | 0 |
| 0 | i | 23 | 0 |
| 1 | a | 2 | 0 |
| 2 | i | 3 | 0 |
| 3 | n | 4 | 0 |
| 4 | i | 5 | 0 |
| 5 | n | 6 | 0 |
| 6 | g | 7 | K1 |
| 8 | r | 9 | 0 |
| 9 | a | 10 | 0 |
| 10 | i | 11 | 0 |
| 11 | n | 12 | 0 |
| 12 | s | 13 | K2 |
| 14 | s | 15 | 0 |
| 14 | i | 19 | 0 |
| 15 | d | 16 | 0 |
| 16 | a | 17 | 0 |
| 17 | q | 18 | K3 |
| 19 | n | 20 | 0 |
| 20 | e | 21 | K4 |
| 22 | n | 23 | 0 |
| 23 | t | 24 | K5 |
| * | * | 0 | 0 |

FIG. 3A

|  | TCAM entries | SRAM entries | |
|---|---|---|---|
| current state | character | next state | result |
| 0 | r | 1 | 0 |
| 0 | d | 8 | 0 |
| 0 | n | 14 | 0 |
| 0 | i | 23 | 0 |
| 1 | a | 2 | 0 |
| 1 | r | 1 | 0 |
| 1 | d | 8 | 0 |
| 1 | n | 14 | 0 |
| 1 | i | 22 | |
| ... | ... | ... | ... |
| 6 | g | 7 | 0 |
| 6 | e | 21 | K4 |
| 6 | t | 24 | K5 |
| 6 | s | 15 | 0 |
| 6 | r | 1 | 0 |
| 6 | d | 8 | 0 |
| 6 | n | 14 | 0 |
| 6 | i | 22 | 0 |
| ... | ... | ... | ... |
| 15 | d | 16 | 0 |
| 15 | r | 1 | 0 |
| 15 | n | 14 | 0 |
| 15 | i | 22 | 0 |
| ... | ... | ... | ... |
| 20 | e | 21 | K4 |
| 20 | t | 24 | K5 |
| 20 | s | 15 | 0 |
| 20 | r | 1 | 0 |
| 20 | d | 8 | 0 |
| 20 | n | 14 | 0 |
| 20 | i | 22 | 0 |
| ... | ... | ... | ... |
| * | * | 0 | 0 |

FIG. 3B

|  | TCAM entries | | SRAM entries | |
|---|---|---|---|---|
|  | current state | character | next state | result |
| 302(1) → | 1 | a | 2 | 0 |
|  | ... | ... | ... | ... |
| 302(6) → | 6 | g | 7 | 0 |
|  | 6 | e | 21 | K4 |
| 304(6) { | 6 | t | 24 | K5 |
|  | 6 | s | 15 | 0 |
|  | ... | ... | ... | ... |
| 302(12) → | 12 | s | 13 | K2 |
| 304(12) { | 12 | i | 5 | 0 |
|  | 12 | t | 24 | K5 |
|  | ... | ... | ... | ... |
|  | 15 | d | 16 | 0 |
|  | ... | ... | ... | ... |
| 302(20) → | 20 | e | 21 | K4 |
| 304(20) { | 20 | t | 24 | K5 |
|  | 20 | s | 15 | 0 |
|  | ... | ... | ... | ... |
| 308r → | * | r | 1 | 0 |
| 308d → | * | d | 8 | 0 |
| 308n → | * | n | 14 | 0 |
| 308i → | * | i | 22 | 0 |
| 301 → | * | * | 0 | 0 |

FIG. 3C

|  | TCAM entries |  | SRAM entries |  |
| --- | --- | --- | --- | --- |
|  | encoded current state | character | next state | result |
| 312(2) → | $Z_2$ | a | 3 | 0 |
| 312(3) → | $Z_3$ | i | 4 | 0 |
|  | ... | ... | ... | ... |
| 312(6) ⎧ | $Z_6$ | n | 7 | 0 |
|  { | $Z_6$ | e | 21 | K4 |
|  ⎩ | $Z_6$ | t | 24 | K5 |
|  | ... | ... | ... | ... |
| 312(15) → | $Z_{15}$ | d | 16 | 0 |
|  | ... | ... | ... | ... |
| 312(20) ⎰ | $Z_{20}$ | e | 21 | K4 |
|  ⎱ | $Z_{20}$ | t | 24 | K5 |
|  | ... | ... | ... | ... |
| 311(1) → | * | a | 2 | 0 |
| 311(8) → | * | r | 9 | 0 |
| 311(14) → | * | s | 15 | 0 |
| 311(22) → | * | n | 23 | 0 |
| 308r → | * | r | 1 | 0 |
| 308d → | * | d | 8 | 0 |
| 308n → | * | n | 14 | 0 |
| 308i → | * | i | 22 | 0 |
| 301 → | * | * | 0 | 0 |

| TCAM entries | | | SRAM entries | |
|---|---|---|---|---|
| encoded current state | character | | next state | result |
| $Z_3$ | a | i | 4 | 0 |
| ... | ... | ... | ... | ... |
| $Z_6$ | i | n | 7 | 0 |
| $Z_6$ | i | n | 21 | K4 |
| $Z_6$ | i | n | 24 | K5 |
| ... | ... | ... | ... | ... |
| $Z_{15}$ | n | s | 16 | 0 |
| ... | ... | ... | ... | ... |
| $Z_{20}$ | i | n | 21 | K4 |
| $Z_{20}$ | i | n | 24 | K5 |
| ... | ... | ... | ... | ... |
| * | r | a | 3 | 0 |
| * | * | r | 2 | 0 |
| * | * | d | 9 | 0 |
| * | * | s | 15 | 0 |
| * | * | n | 23 | 0 |
| * | * | r | 1 | 0 |
| * | * | d | 8 | 0 |
| * | * | n | 14 | 0 |
| * | * | i | 22 | 0 |
| * | * | * | 0 | 0 |

FIG. 3E

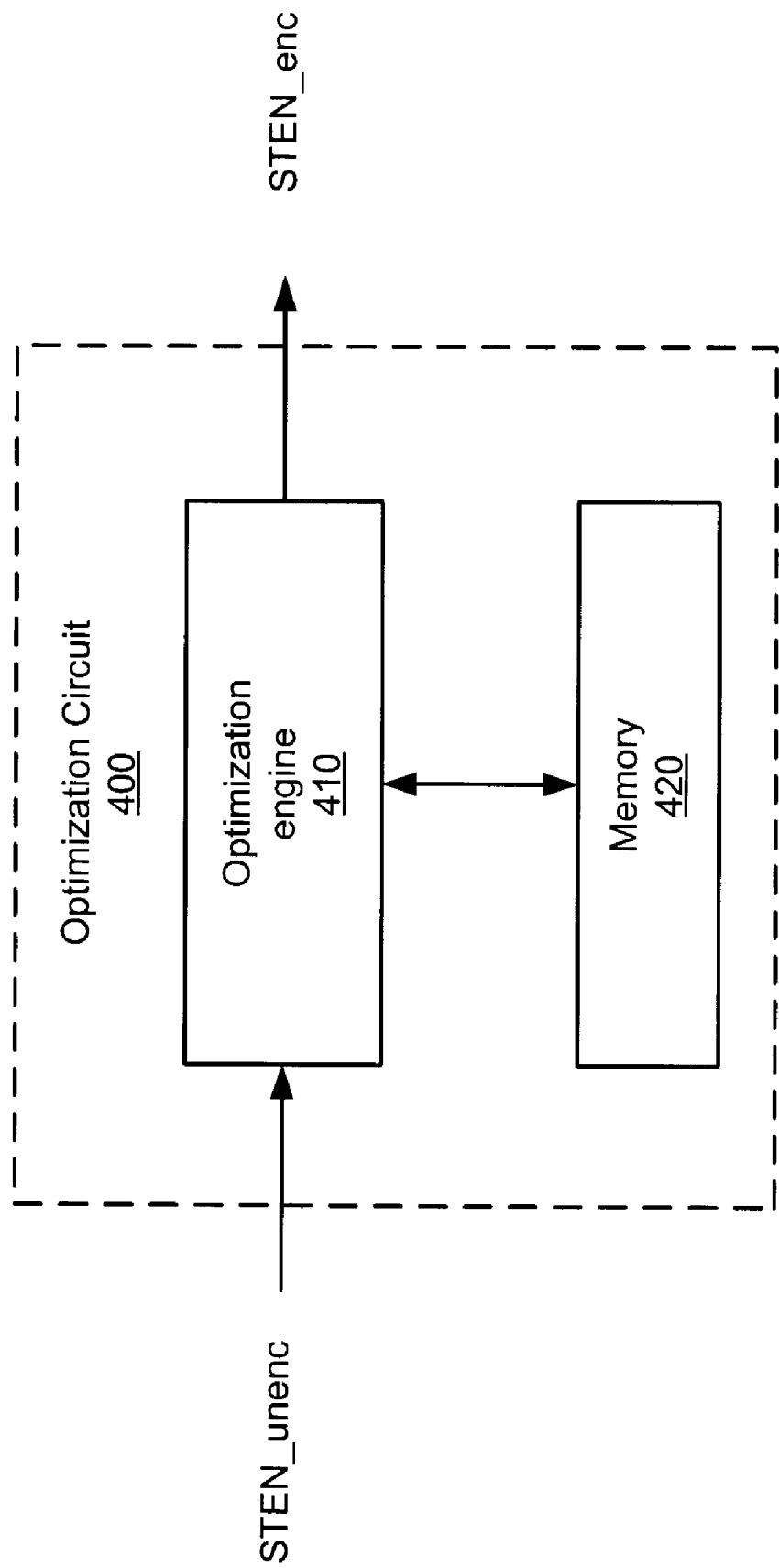

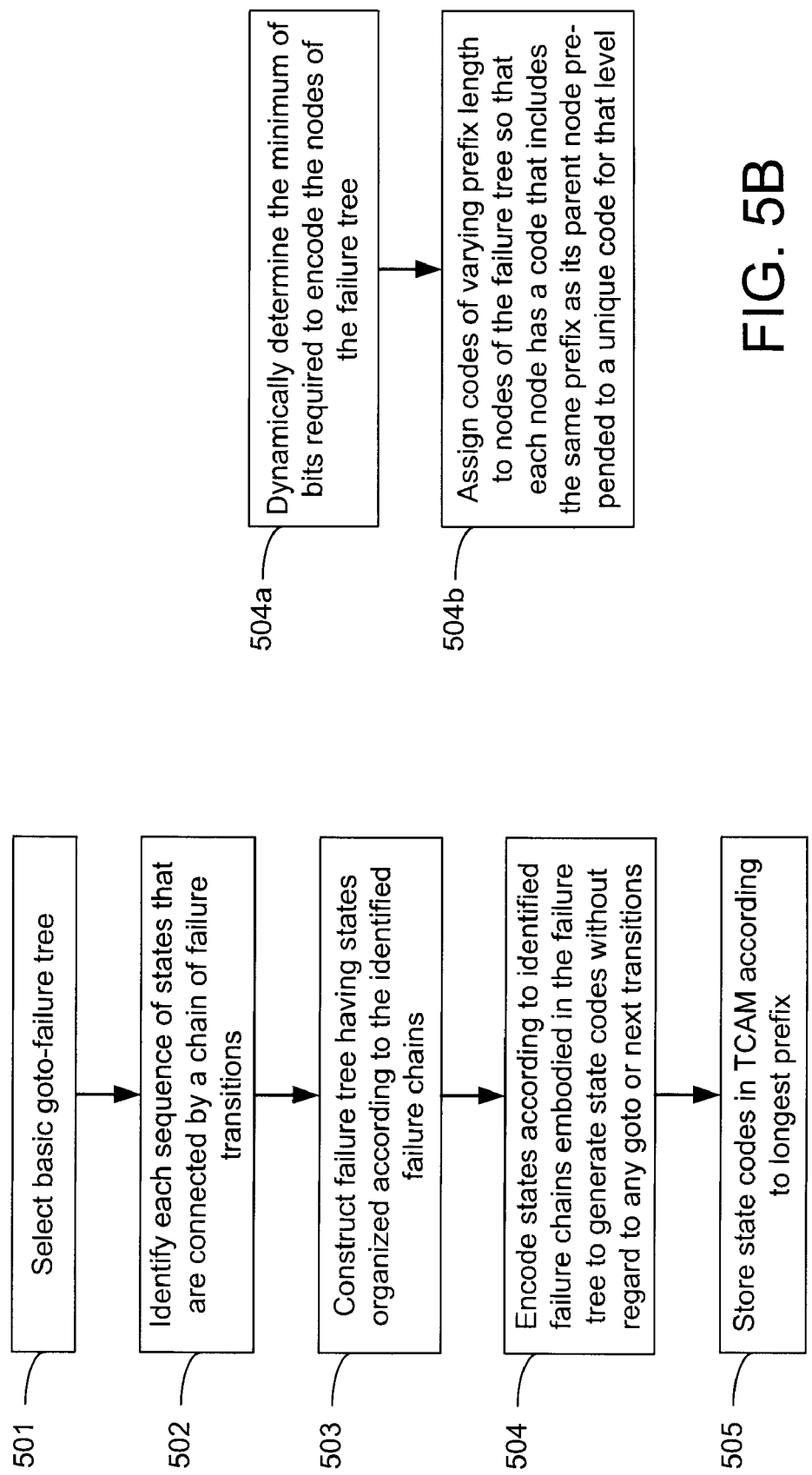

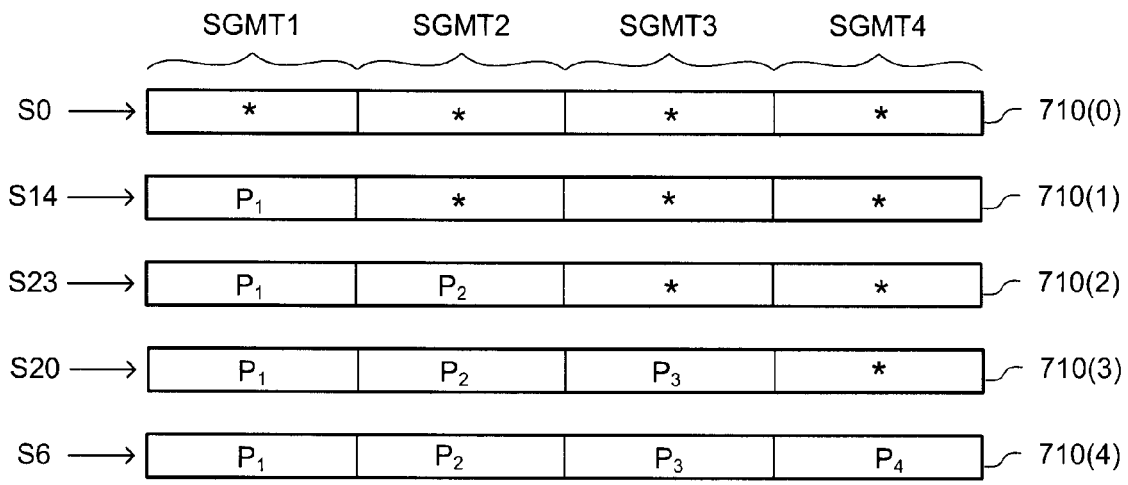
FIG. 7A
| TCAM address | node | state code ||||
|---|---|---|---|---|---|
| | | SGMT1 | SGMT2 | SGMT3 | SGMT4 |
| 0 | S6 | $P_1$ | $P_2$ | $P_3$ | $P_4$ |
| 1 | S20 | $P_1$ | $P_2$ | $P_3$ | * |
| 2 | S23 | $P_1$ | $P_2$ | * | * |
| 3 | S14 | $P_1$ | * | * | * |
| 4 | S0 | * | * | * | * |
FIG. 7B
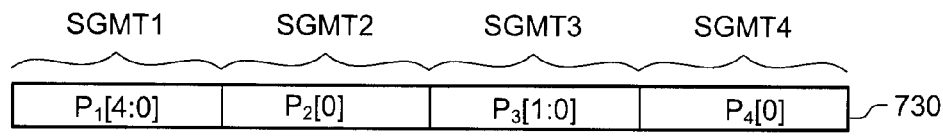
FIG. 7C

ASSIGNING ENCODED STATE VALUES TO A SEARCH TREE ACCORDING TO FAILURE CHAINS

FIELD OF INVENTION

This invention generally relates to the field of string search devices and, in particular, to optimizing the processing speed and storage area requirements of search engines used to implement multiple pattern search operations on input data sequences.

BACKGROUND OF RELATED ART

The problem of string searching occurs in many applications. The string search algorithm looks for a string called a "pattern" within a larger input string called the "text." Multiple string searching refers to searching for multiple such patterns in the text string without having to search in multiple passes. In a string search, the text string is typically longer than several million bits long with the smallest unit being one octet in size. The start of a pattern string within the text is typically not known. A search method that can search for patterns when the start of patterns within the input string is not known in advance is known as unanchored searching. In an anchored search, the search algorithm is given the input string along with information on the offsets for start of the strings.

A network system attack (also referred to herein as an intrusion) is usually defined as an unauthorized or malicious use of a computer or computer network. In some cases, a network system attack may involve hundreds to thousands of unprotected network nodes in a coordinated attack, which is levied against specific or random targets. These attacks may include break-in attempts, including but not limited to, email viruses, corporate espionage, general destruction of data, and the hijacking of computers/servers to spread additional attacks. Even when a system cannot be directly broken into, denial of service attacks can be just as harmful to individuals and companies, who stake their reputations on providing reliable services over the Internet. Because of increasing usage and reliance upon network services, individuals and companies have become increasingly aware of the need to combat system attacks at every level of the network, from end hosts and network taps to edge and core routers.

Intrusion Detection Systems (or IDSs) are emerging as one of the most promising ways of providing protection to systems on a network. Intrusion detection systems automatically monitor network traffic in real-time, and can be used to alert network administrators to suspicious activity, keep logs to aid in forensics, and assist in the detection of new viruses and denial of service attacks. They can be found in end-user systems to monitor and protect against attacks from incoming traffic, or in network-tap devices that are inserted into key points of the network for diagnostic purposes. Intrusion detection systems may also be used in edge and core routers to protect the network infrastructure from distributed attacks.

Intrusion detection systems increase protection by identifying attacks with valid packet headers that pass through firewalls. Intrusion detection systems provide this capability by searching both packet headers and payloads (i.e., content) for known attack data sequences, referred to herein as "signatures," and following prescribed actions in response to detecting a given signature. In general, the signatures and corresponding response actions supported by an intrusion detection system are referred to as a "rule-set database," "IDS database" or simply "database." Each rule in the database typically includes a specific set of information, such as the type of packet to search, a string of content to match (i.e., a signature), a location from which to start the search (e.g., for anchored searches), and an associated action to take if all conditions of the rule are matched. Different databases may include different sets of information, and therefore, may be tailored to particular network systems or types of attack.

At the heart of most modern intrusion detection systems is a string matching engine that compares the data arriving at the system to one or more signatures (e.g., strings or patterns) in the rule-set database and flags data containing an offending (e.g., matching) signature. As data is generally searched in real time in ever-faster network devices and rule databases continue to grow at a tremendous rate, string matching engines require rapidly increasing memory capacity and processing power to keep pace. Consequently, to avoid the escalating costs associated with ever-increasing hardware demands, designers have endeavored to improve the efficiency of the string matching methodology itself.

The classic Aho-Corasick algorithm builds a deterministic finite state automaton (DFA) that encodes all the strings to be searched. The DFA is typically constructed in two phases. In the first phase, a search tree such as a goto-failure state diagram embodying the patterns to be matched is constructed, with each string represented by a sequence of states extending from the root node with goto transitions (e.g., success transitions) inserted between sequential states. The strings that share a common prefix also share a corresponding set of parent nodes in the tree, and the distance of a state from the root node in the tree is called the depth of that state. To match a string, the state machine starts at the root node and transitions states according to the goto transitions of the search tree. For example, if in a given state the input character matches the goto transition, the goto transition is taken to the next state in the string path and a cursor is incremented to point to the next character in the input string. Conversely, if the input character does not match the goto transitions at any given state, which results in edge failure, a failure transition may be taken.

In the second phase, next transitions are inserted to states that represent prefixes of states that result in edge failure so that instead of returning to the root node upon edge failure, the state machine can transition to another state that represents an accumulated prefix of the state that resulted in edge failure and advance the cursor to a next input character in the input string. The addition of next transition thus improves performance by avoiding the re-examination of input characters upon edge failure.

State machines constructed using the Aho-Corasick technique are often implemented using an architecture that includes a ternary content addressable memory (TCAM), an associated memory such as SRAM, and control logic. Each TCAM entry represents a corresponding transition in the state machine, and is associated with a corresponding entry in the SRAM whose address is computed from the TCAM index. More specifically, the TCAM entries are logically partitioned into a current state field and an input character field (e.g., which contains a goto transition from the state), and the SRAM entries are partitioned into a next state field, a result field, and an action field. Although TCAM devices are effective in performing string search operations, storage limitations of TCAM devices undesirably limit the size and number of signatures of a search tree that can be stored in the TCAM device. Therefore, there is a need to more efficiently store the state entries of a search tree in TCAM devices.

BRIEF DESCRIPTION OF THE DRAWINGS

The present invention is illustrated by way of example and not intended to be limited by the figures of the accompanying drawings, where:

FIG. 3A shows a table showing TCAM current state and input character entries and SRAM next state entries for the search tree of FIG. 1A;

FIG. 3B shows a table showing TCAM current state and input character entries and SRAM next state entries for the search tree of FIG. 1C;

FIG. 3C shows a table illustrating compression of TCAM current state and input character entries and SRAM next state entries for the search tree of FIG. 1C using masking techniques;

FIG. 3D shows a table illustrating further compression of TCAM current state and input character entries and SRAM next state entries using state encoding techniques to eliminate entries for next transitions to states at depth $D \leq 2$;

FIG. 3E shows a table illustrating further compression of TCAM current state and input character entries and SRAM next state entries using state encoding techniques to eliminate entries for next transitions to states at depth $D \leq 3$;

FIG. 4 shows a simplified functional block diagram of an optimization circuit that may be used to generate encoded state entries for a search tree in accordance with embodiments of the present invention;

FIG. 5A shows an illustrative flow chart depicting an exemplary operation for generating encoded state entries for the node of a failure tree embodying the failure transitions of a goto-failure state graph in accordance with some embodiments of the present invention;

FIG. 5B shows an illustrative flow chart depicting a general technique for assigning unique state codes to the nodes of a failure tree generated in accordance with some embodiments of the present invention;

FIG. 7A illustrates exemplary format for the current state fields of TCAM entries for storing state information for the failure tree of FIG. 6;

FIG. 7B illustrates the storage of the TCAM entries of FIG. 7A in a TCAM device according to prefix length;

FIG. 7C illustrates current state field segment sizes of one embodiment of FIG. 7A;

Like reference numerals refer to corresponding parts throughout the drawing figures.

DETAILED DESCRIPTION

Figure 1A:
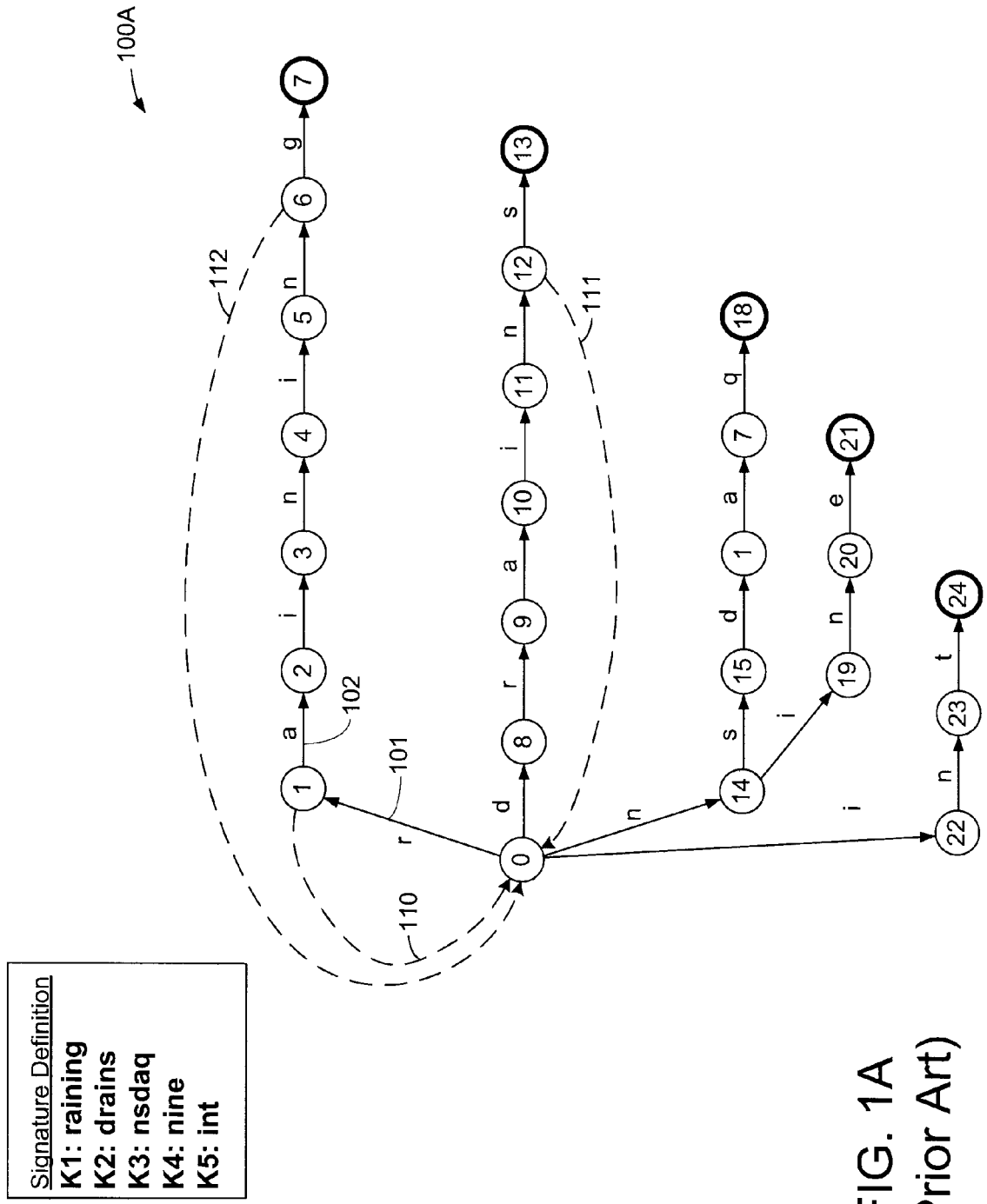
FIG. 1A shows a search tree for pattern matching including goto transitions.

In the following description, numerous specific details are set forth such as examples of specific, components, circuits, and processes to provide a thorough understanding of the present invention. It will be apparent, however, to one skilled in the art that these specific details need not be employed to practice the present invention. In other instances, well known components or methods have not been described in detail in order to avoid unnecessarily obscuring the present invention. As used herein, the terms "search tree" and "state graph" refer to state diagrams that embody one or more signatures to be searched for in an input string during string search operations, and are thus interchangeable. Further, the term "success transition," which refers herein to a goto transition from a current state to a next state in a search tree, is also commonly referred to as a "success edge."

Embodiments of the present invention include various method steps, which will be described below. The steps may be performed by hardware components or may be embodied in machine-executable instructions, which may be used to cause hardware components (e.g., a processor, programming circuit) programmed with the instructions to perform the steps. Alternatively, the steps may be performed by a combination of hardware and software.

Embodiments of the present invention may be provided as a computer program product, or software, that may include a machine-readable medium having stored thereon instructions. The machine readable medium may be used to program a computer system (or other electronic devices) to generate articles (e.g., wafer masks) used to manufacture embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

The machine readable medium may store data representing an integrated circuit design layout that includes embodiments of the present invention. The design layout for the integrated circuit die may be generated using various means, for examples, schematics, text files, gate-level netlists, hardware description languages, layout files, etc. The design layout may be converted into mask layers for fabrication of wafers containing one or more integrated circuit dies. The integrated circuit dies may then be assembled into packaged components. Design layout, mask layer generation, and the fabrication and packaging of integrated circuit dies are known in the art; accordingly, a detailed discussion is not provided.

It should be noted that the steps and operations discussed herein (e.g., the loading of registers) may be performed either synchronously or asynchronously. The term "coupled" as used herein means connected directly to or connected through one or more intervening components or circuits. Any of the signals provided over various buses described herein may be time multiplexed with other signals and provided over one or more common buses. Additionally, the interconnection between circuit elements or blocks may be shown as buses or as single signal lines. Each of the buses may alternatively be single signal lines, and each of the single signal lines may alternatively be buses. Additionally, the prefix symbol "/" or the suffix "B" attached to signal names indicates that the signal is an active low signal. Each of the active low signals may be changed to active high signals as generally known in the art.

The classic Aho-Corasick algorithm builds a finite state machine for performing multiple string matching operations. The state machine is typically constructed as a search tree embodying the patterns to be matched, with each string represented by a sequence of states extending from the root node with goto or success characters transitions inserted between sequential states of the strings. The strings that share a common prefix also share a corresponding set of parent nodes in the tree, and the distance of a state from the root node in the tree is called the depth of that state.

For example, FIG. 1A is a goto-failure state diagram 100A illustrating the goto transitions of a search tree embodying a signature definition including signatures K1-K5, where K1="raining," K2="drains," K3="nsdaq," K4="nine," and K5="int." The sequences of states are connected by goto transitions representing character matches with an input string, and each state also includes a failure transition to the root node S0 that is taken if the input character does not match any goto transitions at the state (for simplicity, only a few direct failure transitions to the root node are depicted in FIG. 1A (e.g., such as the failure transition 110 from S1 to S0, the failure transition 111 from S12 to S0, and the failure transition 112 from S6 to S0). For example, if an input character "r" is received at the root node S0, state machine transitions to S1 along the "r" goto transition 101, and the cursor is incremented to the next input character in the input string. Then, if the next input character is an "a," the state machine transitions from S1 to S2 along the "a" goto transition 102. Conversely, if at S1 the next input character is an "n," which does not match the "a" goto transition 102 from S1, then the failure transition 110 is taken to S0, and the input character is re-examined at S0 in a next search operation. Note that states S7, S13, S18, S21, and S24 are designated as output states (and shown in bold to indicate such) because if any of those states is reached, a corresponding signature has been matched by the input string, and an output code indicating the matching signature may be provided.

Figure 1B:
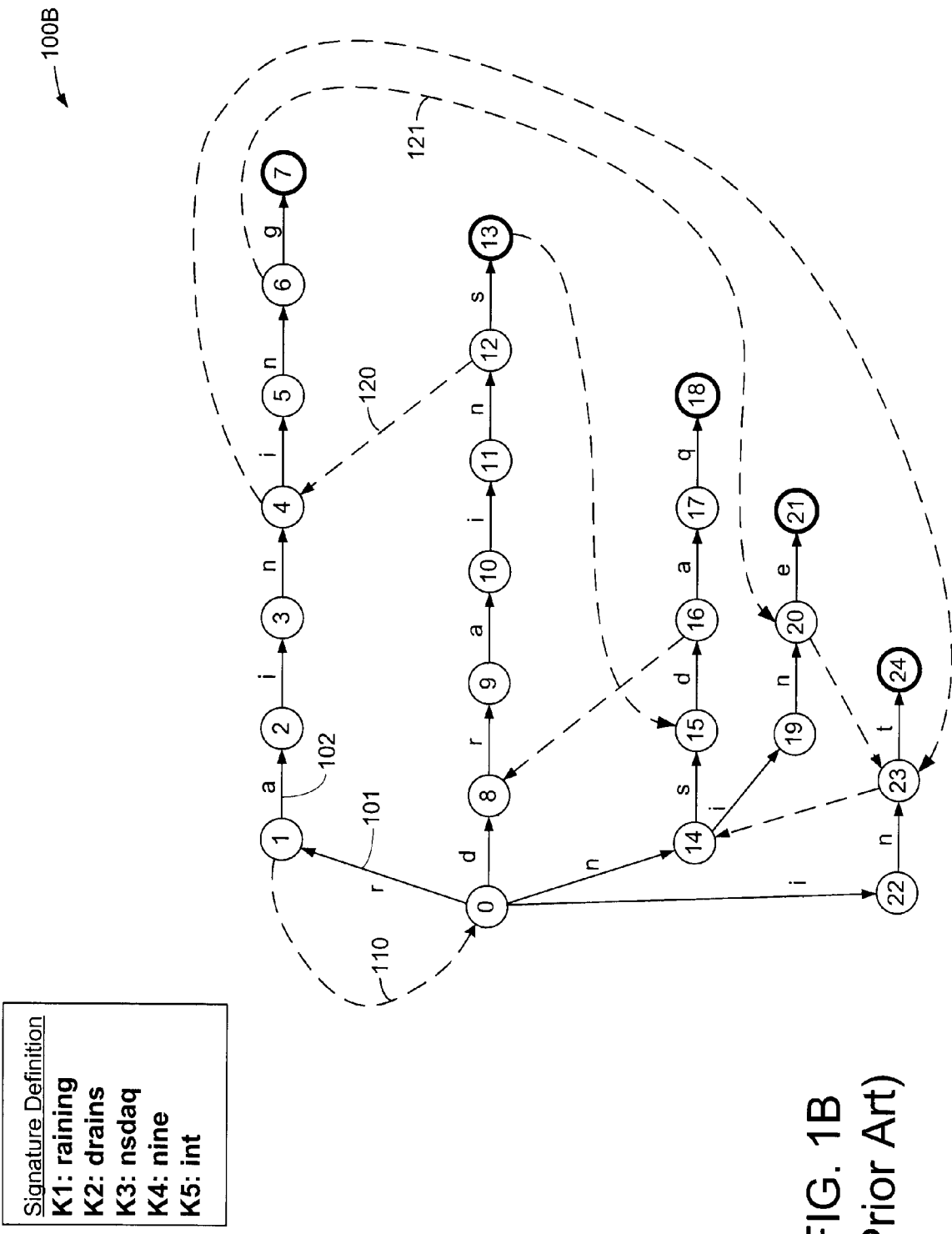
FIG. 1B shows a search tree for pattern matching including goto transitions and failure transitions constructed using Aho-Corasick techniques.

To improve performance, some failure transitions to the root node S0 may be replaced with failure edges to non-root states that constitute an accumulated prefix within the path in which edge failure occurs. More specifically, FIG. 1B is a goto-failure tree 100B embodying signatures K1-K5 represented in the basic goto-failure tree 100A and having non-root failure edges to states representing accumulated prefixes of the state resulting in edge failure. For one example, because state S4 represents the partial pattern "rain" of K1, which is an accumulated prefix of partial pattern "drain" reached at state S12, if edge failure occurs at state S12 because the cursor data is not an "s", the search engine may transition directly to S4 via failure transition 120 (e.g., as depicted in FIG. 1B) and re-examine the input character for a possible match with the "i" goto transition from S4 to S5. Thus, if the state machine of FIG. 1B receives the input character "i" when the state machine is in S12, the state machine first fails to S4 via failure transition 120, and then re-examines the "i" input character and takes the matching "i" goto transition from S4 to S5. In contrast, a state machine operating according to the basic goto-failure tree 100A of FIG. 1A would, in response to receiving the input character "i" at S12, first take the failure transition 111 from S12 to S0, then rewind the cursor by 5 positions (e.g., corresponding to failing from the D=5 node S12 to the D=0 root node S0), and thereafter traverse through states S1-S4 in response to matching input characters "r-a-i-n," which undesirably requires re-examining multiple input characters.

Similarly, to improve performance, the failure edge 112 from S6 to S0 in FIG. 1A can be replaced by a failure edge 121 from S6 to S20 as shown in FIG. 1B. For example, if the input character received while the state machine is in S6 is not "g," the prefix "nin" already matched by the state machine at S6 is the same as the prefix pattern "nin" represented by S20, and thus the state machine fails directly from S6 to S20 (e.g., without having to re-examine the previously matched input characters "n-i-n")."

Figure 1C:
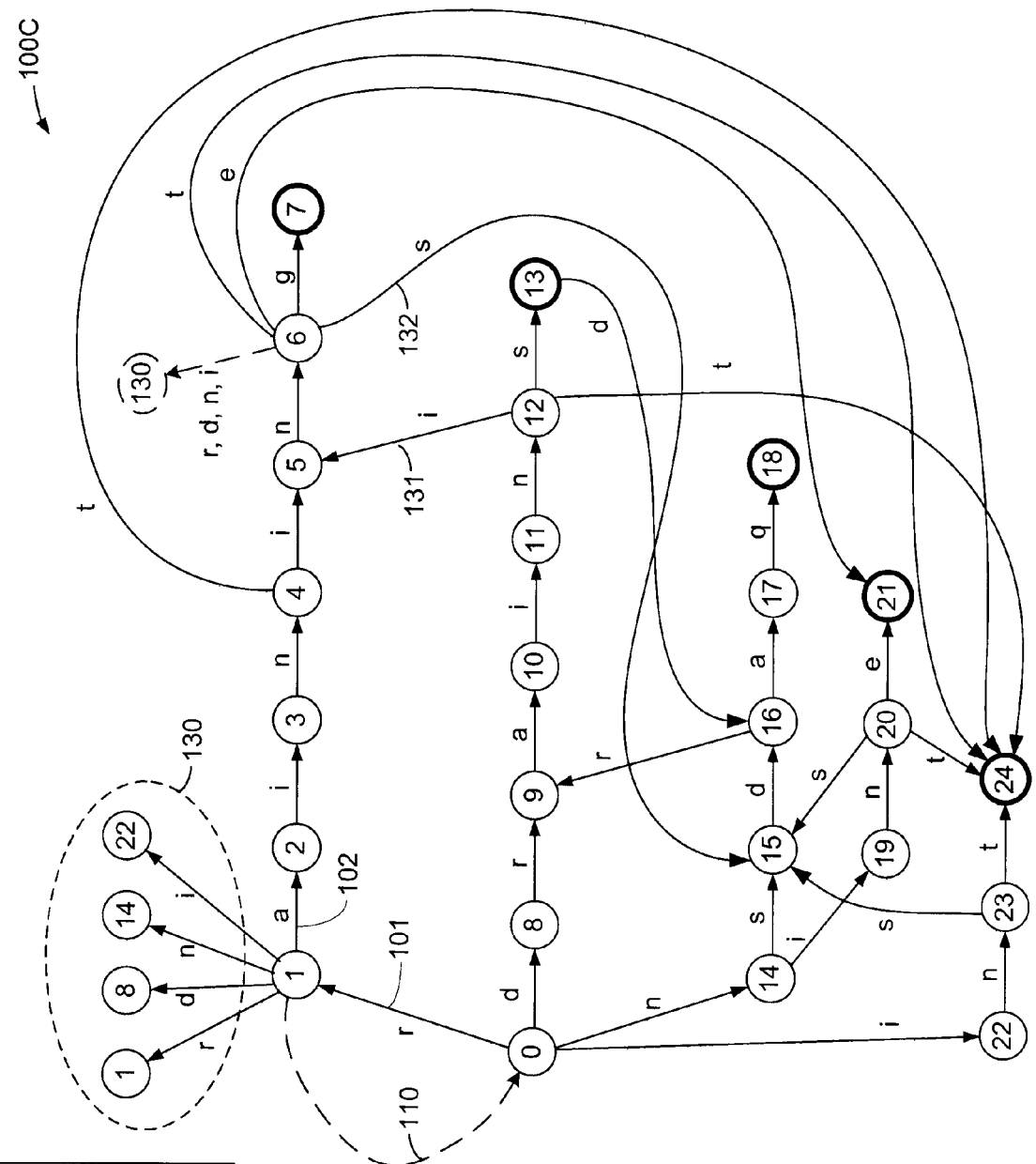
FIG. 1C shows a search tree for pattern matching including goto transitions and next transitions that eliminate the transitions of the search tree of FIG. 1B.

Performance may be further improved by inserting next transitions to states that represent prefixes of states that result in edge failure. As commonly known, next transitions are goto transitions that lead to a state in another branch of the search tree, and therefore provide a mechanism to transition directly to a next state that represents an accumulated prefix of the state that resulted in edge failure without having to re-examine the input character. For example, FIG. 1C is a state diagram 100C illustrating the insertion of next transitions to the goto-failure search tree 100B (embodying signatures K1-K5) in accordance with the Aho-Corasick technique. For example, if an "i" is received at S12, the state machine of FIG. 1C can transition directly to S5 along the "i" next transition 131 (e.g., without first failing to S4 along failure transition 120 of FIG. 1B and then re-examining the input character "i" at S4, as required by state machines operating according to the search tree 100B of FIG. 1B). For another example, an "s" next transition 132 is added from S6 to S15 in FIG. 1C so that if an input character "s" is received when the state machine is at S6, the state machine can transition directly to S15 without having to re-examine any input characters, thereby improving performance.

In addition, to ensure that the cursor is advanced upon all failure transitions to the root node S0, next transitions to each state at a depth D=1 in the search tree are added to all states, as illustrated by next transitions 130 in FIG. 1C. For simplicity, only the next transitions 130 to D=1 states from state S1 are shown in FIG. 1C. However, for actual embodiments, it is to be understood that each state in search tree 100C of FIG. 1C includes next transitions to each of the depth level D=1 states 130 of the search tree. In this manner, performance is improved, as compared to search tree 100B of FIG. 1B, because input characters are not re-examined upon edge failure to the root node. More specifically, if the input character received at any state in the search tree 100C of FIG. 1C is an "r," "d," "n," or "i," a corresponding next transition is taken directly to S1, S8, S14, or S22, respectively, without first failing to the root node S0. As a result, if the state machine fails to S0, the input character is not an "r," "d," "n," or "i," and therefore the state machine does not need to re-examine the input character.

Figure 2A:
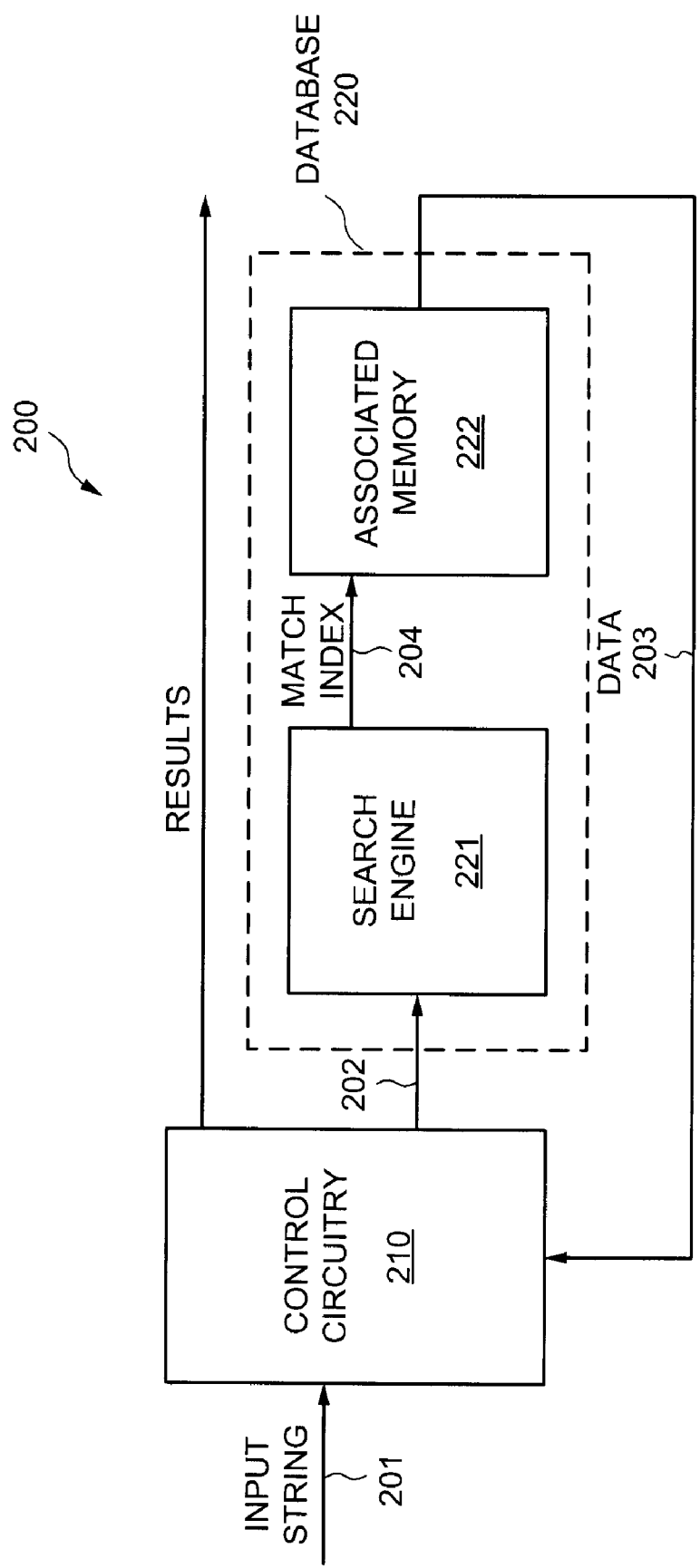
FIG. 2A shows a simplified functional diagram of a string search apparatus for performing string search operations.

As mentioned above, state machines performing string search operations embodied by search trees such as search trees 100A-100C can be implemented using hardware architectures. For example, FIG. 2A illustrates a string search apparatus 200 including control circuitry 210 coupled to a database 220. Control circuitry 210, which receives an input string of characters 201 from another device such as a network processor (not shown for simplicity), is coupled to pattern and state database 220, which in turn searches the database for one or more patterns for a match with the input string 201. Each character in the input string 201 is typically encoded using a well-known encoding scheme, such as ASCII or EBSDIC. For example, using the ASCII encoding scheme, each input character is encoded using a well-known 8-bit code. Typically, each character is encoded into one octet, although other encodings may be used. In one particular embodiment, the control circuitry 210 processes one character from the input text string at a time. Alternatively, control circuitry 210 may processes multiple characters at a time when a higher search rate is required. The multiple characters may be presented to control circuitry 210 at the same time or sequentially in time.

Figure 2B:
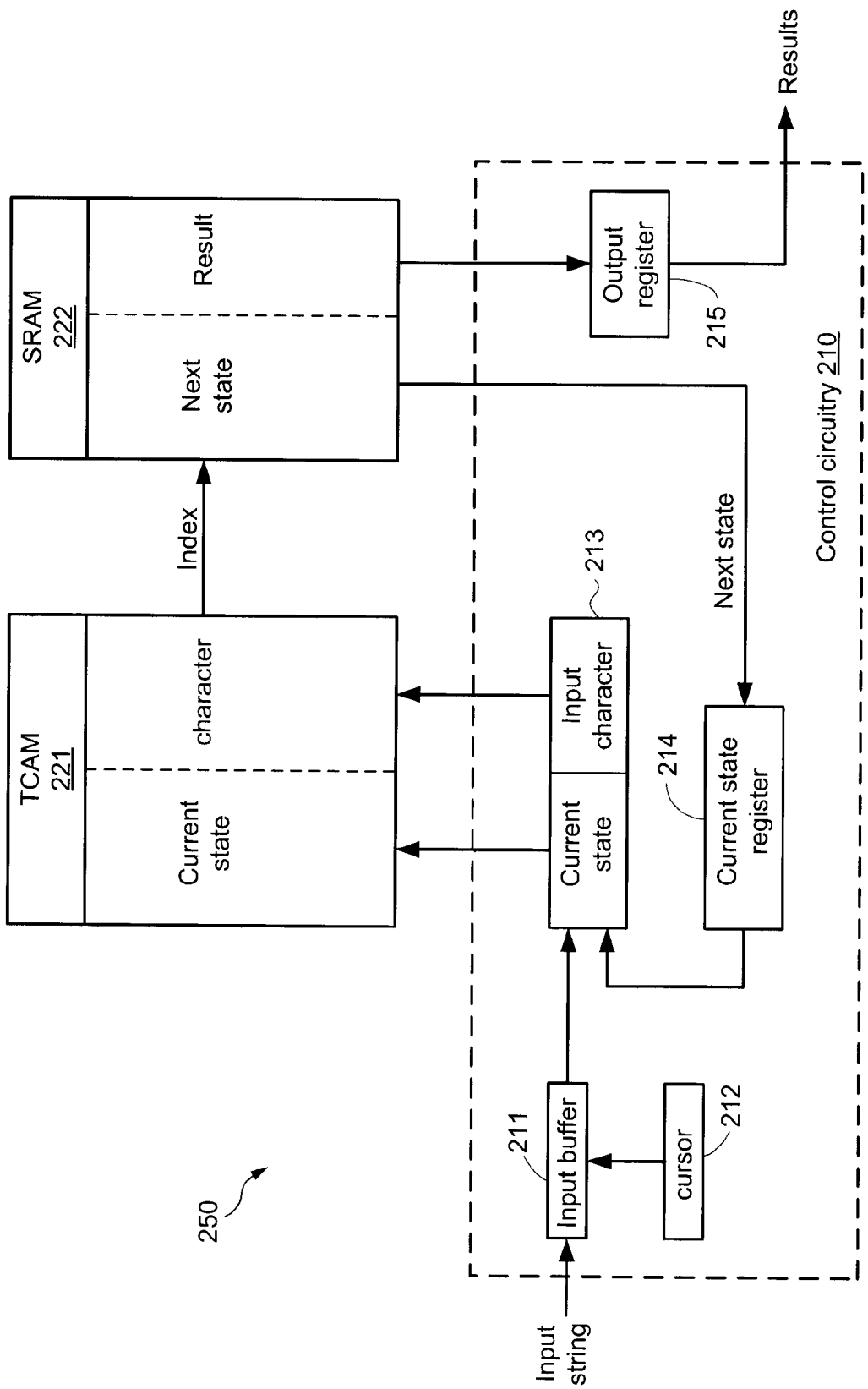
FIG. 2B shows a simplified functional diagram of a TCAM-based string search apparatus.

FIG. 2B shows a TCAM-based implementation 250 of string search apparatus 200. More specifically, control circuitry 210 includes an input buffer 211, a cursor register 212, a comparand register 213, a current state register 214, and an output register 215. Further, as shown in FIG. 2B, search engine 221 is implemented as a TCAM, and associated memory 222 is implemented as an SRAM. TCAM 221, which may be any suitable TCAM device capable of performing search operations in which individual CAM entries can be selectively masked, includes a plurality of rows for storing a plurality of entries. SRAM 222, which is well-known, includes a plurality of rows each of which may be addressed by an index generated by TCAM 221 in response to compare operations therein.

To implement a state machine that compares an input string with signatures embodied in a search tree, each state transition of the search tree is represented by a corresponding pair of entries in the TCAM 221 and SRAM 222. More specifically, each TCAM entry is logically partitioned into a current state field and a character field, and each SRAM entry is partitioned into a next state field and a result field. The current state field stores a state value (e.g., state number) for a corresponding state, and the character field stores a binary representation of the goto transition associated with the corresponding state.

The input buffer 211 stores characters of the input string, and cursor register 212 stores a cursor that points to a current input character that is to be forwarded to comparand register 213. The current state register 214 stores a current state of the state machine, and is coupled to the comparand register 213. The current state register 214 is initialized to zero (e.g., indicating that the state machine starts at the root node S0), and the cursor is initialized to the start of the input string. The current state provided by register 214 is concatenated with the input character provided by input buffer 211 to form a comparand word that is provided to TCAM 221 for comparison with the TCAM entries stored therein.

During compare operations, if there is a matching entry in TCAM 221, the TCAM outputs an index of the highest-priority matching (HPM) entry. The HPM index addresses a corresponding location in SRAM 222 that contains the next state information and a result code (if any). The cursor is advanced to cause input buffer 211 to forward the next input character in the input string to comparand register 213, and the next state value read from SRAM 222 is stored in the current state register 214 as the current state (thereby indicating a state transition to the next state). The new search key formed by the concatenation of the next state value read from the SRAM 222 and the next input character from input buffer 211 is then provided to TCAM 221 for the next compare operation. This process is repeated in a well-known manner until there is no match in the TCAM or until result code is output from SRAM 222 to indicate that one of the signatures stored in the database is matched by the input string. If there is no match in TCAM 221, the current state is reset to the start state (e.g., to state S0), and the cursor is advanced. Although not shown for simplicity, the SRAM entries may also includes an input length field that indicates how many of the input characters are to be forwarded from input buffer 211 to comparand register 213 for multiple character transitions on a compressed state machine.

Table 300A of FIG. 3A illustrates the TCAM entries and corresponding SRAM entries that may be used to implement search operations according to the search tree 100A of FIG. 1A. As described above, each TCAM entry represents a state in the state machine and one of its goto transitions, and the associated SRAM entry indicates the next state information if the input character matches the corresponding goto transition. If a state has multiple goto transitions, then multiple TCAM entries are required for the state. For example, because there are 4 goto transitions (r, d, n, i) originating at root node S0, there are 4 TCAM-SRAM entry pairs for state S0, as indicated by the first four state entries in the Table 300A of FIG. 3A. Further, because TCAM entries can be individually masked, all the failure transitions to the root node S0 may be represented in TCAM 221 by a single masked entry 301 so that if no other higher-priority TCAM entries are matched, the lowest priority masked entry 301 will match and cause the SRAM to read out the next state information, which instructs the state machine to return to the root node S0.

Note for the exemplary search trees 100A-100C, which includes 25 states, $\log_2 25 = 5$ bits are required to represent all the states, and each input character requires 8 encoded bits to represent, and therefore each TCAM entry must include at least 8+5=13 bits (e.g., a 5-bit current state field and an 8-bit input character field).

As mentioned above, next transitions may be added to the search tree 100A to create the optimized search tree 100C of FIG. 1C, which improves performance by ensuring that the cursor is advanced upon edge failure to S0. However, the addition of the next transitions can significantly increase the amount of TCAM and SRAM area required to store the search tree. For one example, while state S1 of search tree 100A requires only one TCAM entry 302(1) in Table 300A corresponding to the "a" goto transition 102 to S2, state 51 of search tree 100C requires TCAM entry 302(1) plus 4 additional TCAM entries 303(1), as shown in Table 300B of FIG. 3B, corresponding to the 4 next transitions to D=1 states S1, S8, S14, and S22. For another example, while state S6 of search tree 100A requires only one TCAM entry 302(6) in Table 300A corresponding to the "g" goto transition to S7, state S6 of search tree 100C requires 7 additional TCAM entries 303(6) and 304(6) representing the next transitions originating at S6 in search tree 100C, where 4 TCAM entries 303(6) correspond to the various next transitions to D=1 states S1, S8, S14, and S22 (shown collectively in FIG. 1C), and the 3 TCAM entries 304(6) represent the next transitions to D>1 states S15 (D=2), S21 (D=4), and S24 (D=3).

The ability of TCAM 221 to selectively mask individual entries may be used to compress the TCAM and SRAM entries of Table 300B to reduce storage requirements. More specifically, all next transitions to D=1 states of the search tree 100C may be represented by a single TCAM entry in which the current state field of the TCAM entry is masked (e.g., using ternary don't care values), as shown in Table 300C of FIG. 3C. For one example, all separate TCAM entries in Table 300B that represent an "r" next transition to the D=1 state S1 may be replaced by a single TCAM state entry 308r so that if a current input character of "r" does not match any higher-priority entries (e.g., TCAM entries having an unmasked current state field and having an "r" in the character field), it will match entry 308r, regardless of the current state of the state machine, and therefore cause the state machine to directly transition to D=1 state S1 and advance the cursor to the next input character in the input string. Similarly, all "d"

next transitions to D=1 state S8 may be replaced by a single entry 308d, all "n" next transitions to S14 may be replaced by a single entry 308n, and all "i" next transitions to D=1 state S22 may be replaced by a single entry 308i. In this manner, the set of next transitions 303(1) for state S1, the set of next transitions 303(6) for state S6, the set of next transitions 303(15) for state S15, and the set of next transitions 303(20) for state S20 (as well as similar sets of next transitions for other states not shown in Table 300B) can be replaced by a single set of TCAM entries 308, as depicted in the compressed state entry table 300C of FIG. 3C, thereby reducing the number of TCAM entries required to store the search tree.

The individual TCAM entries for next transitions to states at higher depths (e.g., D≧1) in the state graph of FIG. 1C can be eliminated by encoding the state numbers stored in the current state fields of the search tree's TCAM entries. For one example, to eliminate next transitions to D=2 states, the state number stored in the current state field of each TCAM state entry can be replaced by an encoded state value having a randomly assigned state code (Z) pre-pended to the binary representation of the input character (C) of the goto transition into that state. The state codes Z for D=1 states are masked values (e.g., ternary don't care values "*") and the state codes Z for all other (e.g., D≧1) states are unique binary numbers, as depicted in Table 300D of FIG. 3D. For example, the current state value of TCAM state entry 311(1) for S1 is of the format ZC="*r" where Z is masked because S1 has a depth D≦1 and C="r" because the goto transition leading into S1 is an "r" transition, and the current state value of TCAM state entry 311(14) for S14 is of the format ZC="*n" where Z is masked because S14 has a depth D≦1 and C="n" because the goto transition leading into S14 is an "n" transition. Further, the current state value of TCAM state entry 312(2) for S2 is of the format ZC="$Z_2$a" where $Z_2$ is a unique number because S1 has a depth D>1 and C="a" because the goto transition leading into S2 is an "a" transition, and the current state values of TCAM state entries 312(6) for S6 are all of the format ZC="$Z_6$n" where $Z_6$ is a unique number because S6 has a depth D>1 and C="n" because the goto transition leading into S6 is an "n" transition. The new encoded state entries 311(1), 311(8), 311(14), and 311(22) for corresponding D=1 states S1, S8, S14, and S22 subsume and thus replace all previous TCAM entries for next transitions to D=2 states S2, S9, S15, and S23, respectively. For example, because the current state value of the state entry 311(14) for the D=1 state S14 is encoded as "*n" and the current state value of every other state that is reached on an "n" goto transition is encoded as $Z_x$n, the TCAM entry 311(14) will match all state entries having an "n" input character and therefore can replace all individual "s" next transitions to D=2 state S15 in Table 300C, as indicated by the omission of separate state entries for S6 and S20 having an "s" input character in Table 300D of FIG. 3D.

For another example, to eliminate next transitions to D=3 states, the state numbers stored in the current state field of each TCAM state entry can be replaced by Z pre-pended to the binary representation of the two input characters ($C_1C_2$) of the goto transition into that state. More specifically, the current state fields of TCAM entries for D=1 states include two mask values and one input character $C_1$, the current state fields of TCAM entries for D=2 states include one mask value and 2 input characters $C_1C_2$, and the current state fields of TCAM entries for all other (e.g., D≧2) states include an ID code Z and 2 input character $C_1C_2$, as depicted in Table 300E of FIG. 3E.

In this manner, state encoding techniques can reduce the number of TCAM entries required to represent the states of a search tree having next transitions such as the search tree 100C of FIG. 1C. However, the elimination of each level of next transitions requires each TCAM entry to store an additional data byte (e.g., 8 bits) for each character leading into that state. More specifically, the elimination of next transitions to all states at depth D≦m of a search tree having N states requires each TCAM entry to store Y=$\log_2$N+8(m-1) bits. For example, while each TCAM entry of Table 3C requires $\log_2$25=5 bits for the current state field, each TCAM entry of Table 3D requires $\log_2$25+8=13 bits for the current state field, and each TCAM entry of Table 3E requires $\log_2$25=5+16=21 bits for the current state field. Thus, to eliminate all next transitions in the search tree 100C of FIG. 1C, which includes a next transition 131 to D=5 state S5, each TCAM entry would require $\log_2$25+(8)*(5−1)=37 bits for the current state field.

Although effective in improving performance and reducing the number of TCAM entries required to represent a given search tree, the state encoding technique described above requires an undesirably large number of bits in the current state field of each TCAM entry. More specifically, as discussed above, eliminating each depth level of next transitions increases each TCAM entry size by 8 bits, which could otherwise be used to represent $\log_2$8=256 states of a search tree. In other words, the elimination of individual next transitions to each depth level of a search using the state encoding technique described above reduces the number of states that can be represented in a TCAM entry by a factor of 256. As a result, because many modern signature definitions for security applications such as intrusion detection systems typically include thousands of signatures, and the width of a TCAM array (e.g., the size of each TCAM entry) is limited (e.g., typically to 72 or 144 bits), increasing the size of the current state fields of each TCAM entry to eliminate individual next transition state entries undesirably limits the number of states of a search tree that may be stored in the TCAM.

Therefore, in accordance with the present invention, a more efficient state encoding technique is disclosed that allows for elimination of all next transitions in a given search tree using only a fraction of the bits of the TCAM entries' current state field that is typically required by the conventional state encoding technique described above. In accordance with embodiments of the present invention, rather than encoding the states of a search tree according to its goto transitions, as described above with respect to Tables 300D and 300E, the states of the search tree are encoded according to its failure transitions. For some embodiments, each sequence of states in a selected goto-failure tree that is connected by a chain of failure transitions is identified, a failure tree embodying the failure chains of the search tree is constructed to include all the states of the search tree re-organized in depth levels according to the number of failure transitions between states, and then the states are encoded according to the failure tree to generate state codes that embody the failure transitions (i.e., rather than the goto transitions of the search tree). By encoding the states of a search tree according to its failure transitions, the number of current state bits of the TCAM entries that store the search tree can be dynamically allocated based upon the number of states in each level of the failure tree. This is in contrast to prior state encoding techniques described above, in which 8 bits of the TCAM entries are statically allocated for each level of next transitions to be eliminated.

FIG. 4 shows a functional block diagram of an optimization circuit 400 that can be employed to generate a construct of a failure tree embodying the failure chains of a desired search tree and to encode the states of the search tree according to the failure chains embodied in the failure tree in a manner that can eliminate all next transition entries using a minimum number of TCAM entry bits. Optimization circuit 400 includes optimization engine 410 and a memory 420. Memory 420, which may be any suitable memory device, stores state and formatting information for optimization engine 410. In operation, optimization engine 410 receives a plurality of un-encoded state entries (STEN_unenc) embodying the goto and failure transitions of a search tree, and in response thereto, generates a construct of a failure tree embodying the failure chains of the search tree, wherein the failure tree is used to generate a number of encoded state entries (STEN_enc) embodying all goto, next, and failure transitions of the search tree.

For example, an exemplary state encoding operation in accordance with the present invention is described below with respect to the illustrative flow chart of FIG. 5A. First, a search tree embodying a desired signature definition is selected (step 501). For some embodiments, a goto-failure state diagram is selected that includes failure transitions to states that represent an accumulated prefix of the state that resulted in the failure, but does not include next transitions to states in other branches. As described in more detail below, because embodiments of the present invention allow for the elimination of all potential next transitions, it is not necessary to consider individual next transitions for state encoding techniques disclosed in accordance with embodiments of the present invention. For this example, the goto-failure state diagram 100B of FIG. 1B is selected, which as described above embodies the signatures K1-K5 (K1="raining," K2="drains," K3="nsdaq," K4="nine," and K5="int"). Of course, for other embodiments, a search tree including next transitions, such as search tree 100C of FIG. 1C, may be selected for encoding according to embodiments of the present invention.

Next, in accordance with the present invention, each sequence of states in the goto-failure tree that is connected by a chain of failure transitions is identified (step 502). For example, the failure chains identified in the selected goto-failure tree 100B are summarized below in Table 1.

TABLE 1

| failure chain | number of states in chain |
|---|---|
| S6 ⇒ S20 ⇒ S23 ⇒ S14 ⇒ S0 | 5 |
| S12 ⇒ S4 ⇒ S23 ⇒ S14 ⇒ S0 | 5 |
| S13 ⇒ S15 ⇒ S0 | 3 |
| S1 ⇒ S0 | 2 |
| S2 ⇒ S0 | 2 |
| . . . | . . . |
| S24 ⇒ S0 | 2 |

Figure 6:
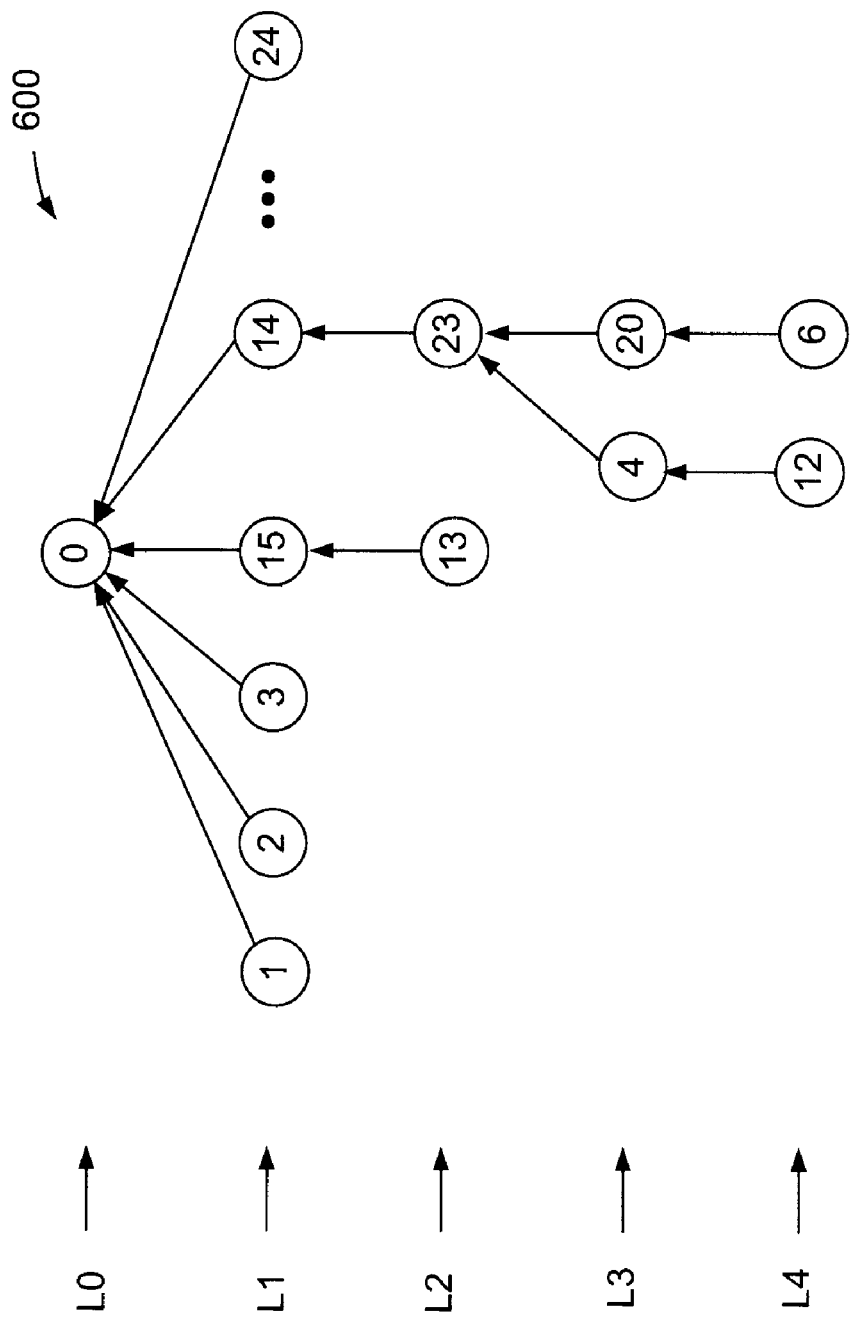
FIG. 6 shows a failure tree created using the failure chains of the goto-failure state graph of FIG. 1B in accordance with some embodiments of the present invention.

Then, a failure tree is constructed according to the identified failure chains, wherein the failure tree includes all the states of the goto-failure tree re-organized in a plurality of depth levels according to the number of failure transitions between each state and the root node (step 503). Thus, the failure tree includes each chain of failure transitions beginning at the farthest node from the root node (e.g., the highest depth-level state of the goto-failure tree) and ending at the root node (e.g., the lowest depth-level state of the goto-failure tree). For example, FIG. 6 shows a failure tree 600 having all states S0-S24 of the search tree 100B re-organized to embody the failure chains from each non-root state to the root state, where each failure chain includes the sequence of states that are taken by the state machine upon edge failure at a corresponding node. For example, taking the failure chain S6⇒S20⇒S23⇒S14⇒S0, which represents the sequence of failure transitions that a state machine operating according to the search tree 100B of FIG. 1B can traverse beginning at failing state S6, if an input character "z" is received at state S6, the state machine fails at S6 to S20, then fails at S20 to S23, then fails at S23 to S14, and then finally fails at S14 to root node S0. As used herein, the root level (L=0) of the failure tree includes only the root node S0, the first level (L=1) of the failure tree includes only states that fail directly to the root node S0, the second level (L=2) includes only states that fail directly to a first level state, and so on. For simplicity, not all of the L=1 states are shown in the failure tree 600 of FIG. 6. Thus, although not shown in FIG. 6, it is to be understood that failure tree 600 includes level L=1 failure chains from each of states S5, S6, S7, S8, S9, S10, S11, S16, S17, S18, S19, S21, S22, and S24 to root node S0.

For purposes of discussion herein, any node in the failure tree that includes one or more nodes that fail thereto is called a parent node, and the originating nodes of the failure transitions are called children of that node. Further, within any given failure chain, the nodes at higher levels (e.g., further from the root node) of the failure tree from a selected node are called its descendents, and the nodes at lower levels (e.g., closer to the root node) of the failure tree from the selected node are called its ancestors. For one example, taking the failure chain S6⇒S20⇒S23⇒S14⇒S0, node S23 includes two children nodes S4 and S20, the parent node of S23 is S14, nodes S4, S12, S6, and S20 are all descendants of S23, and S14 and S0 are ancestors of S23. For another example, because no state fails to state S1 in the goto-failure graph 100B of FIG. 1B, node S1 does not have any children in the failure tree 600 of FIG. 6. Further, the highest-level states in any given failure tree are known as leaf nodes. For example, nodes S1, S13, S12, and S6 (among others) are leaf nodes in the failure tree 600 of FIG. 6.

Note that the failure tree 600 of FIG. 6 is constructed without setting any limit on the number of states allowable within each failure chain. For other embodiments, the failure tree can be constructed to include failure chains that have a selectable maximum chain length (MCL). For example, if a maximum chain length (MCL) value is selected as MCL=3, then the failure chain S6⇒S20⇒S23⇒S14⇒S0 of failure tree 600 can be represented as two separate failure chains S6⇒S20⇒S23 and S14⇒S0, which both have an MCL≦3. By reducing the maximum chain length allowed in the failure tree, the resulting length of the state codes assigned to the states of the search tree can be reduced, which in turn can advantageously reduce power consumption of the TCAM, as described in more detail below.

Next, the state numbers indicating the states of the search tree are encoded according to the identified failure chains embodied in the failure tree to generate unique state codes without regard to any of the goto and/or next transitions in the associated goto-failure search tree (step 504). For some embodiments, the state codes are assigned prefixes of varying lengths according to the depths of the states in each failure chain to maintain a desired prefix property between all states in a given failure chain that allows for the elimination of all next transitions in the selected goto-failure state diagram, as described in more detail below.

More specifically, referring to FIG. 5B, to encode the states of the failure tree, the number of bits required to uniquely encode all the states or nodes of the failure tree is first determined (step 504a). Then, codes of varying prefixes are assigned to the nodes of the failure tree according to the depth levels of the failure tree so that (1) for any given level, all the nodes in the level are assigned unique codes and (2) within any given failure chain, each node contains the prefix of its parent node pre-pended to the unique code for that level, with any remaining least significant bits set to ternary don't care bits "*" (step 504b). Thus, within any given failure chain, the state code for the node at the highest level in the failure chain represents the longest prefix match, the state code for the node at the next highest level in the failure chain represents the next longest prefix match, and so on, where the root node is represented by a state code containing all * bits.

For some embodiments, the current state field of each TCAM entry that stores the state code is divided into a number S of segments, where S is equal to the number of non-root depth levels of the failure tree (e.g., the selected value of MCL), and each segment stores a code portion for a corresponding node level. For example, FIG. 7A illustrates the general format and structure of the current state fields of five TCAM entries 710(0)-710(4) that store state codes for the five nodes within the failure chain S6⇒S20⇒S23⇒S14⇒S0 of failure tree 600, where each TCAM current state field 710(0)-710(4) includes four segments SGMT1-SGMT4 to store state codes because failure tree 600 includes MCL=4 non-root node levels L1-L4. The number of bits in each segment can be calculated using one or more techniques, as described in more detail below. Starting with the root node S0, its entry 710(0) contains ternary don't care bits "*" in all segments SGMT1-SGMT4 because node S0 is the only node at the root level L=0, and thus does not have a parent node. For node S14, its entry 710(1) includes a first segment SGMT1 containing a prefix $P_1$ that is unique to nodes in level L=1, and all other segments include don't care bits "*". For node S2, its entry 710(2) includes a first segment SGMT1 containing the prefix $P_1$ of the code for its parent node S14, a second segment SGMT2 containing a prefix $P_2$ that is unique to all other nodes in level L=2, and all other segments include don't care bits "*". For entry node S20, its entry 710(3) includes segments SGMT1-SGMT2 containing the prefix $P_1P_2$ of the code of its parent node S23, a third segment SGMT3 containing a prefix $P_3$ that is unique to all other nodes in level L=3, and all other segments include don't care bits "*". Lastly, For node S6, its entry 710(4) includes segments SGMT1-SGMT3 containing the prefix $P_1P_2P_3$ of the code of its parent node S20, and its fourth segment SGMT4 contains a prefix $P_4$ that is unique to all other nodes in level L=4. Thus, as depicted in FIG. 7A, the state code for each node in the failure chain S6⇒S20⇒S23⇒S14⇒S0 is formed by pre-pending the prefix of the code of its parent node to a unique code for that level and masking any remaining least significant bits of the state entry. In this manner, the state codes for the nodes in a given failure chain are assigned prefixes of varying length according to the levels of the failure chain.

Referring again to FIG. 5A, after the state codes are assigned to all the states, the state entries representing the search tree are stored in a TCAM (e.g., such as TCAM 221) according to the prefix length of the state codes, where the entries with state codes having the longest prefixes are stored in lower TCAM address locations and the entries with state codes having the shortest prefixes are stored in higher TCAM address locations (step 505). In this manner, during string search operations in a TCAM-based architecture in which the TCAM state entries are stored according to the prefix length of the state codes, if the current state portion of a search key matches the state codes of multiple state entries corresponding to multiple nodes in a given failure chain, the state entry having the state code corresponding to the highest-level node (e.g., the node farthest from the root node) is selected as the matching entry, and the corresponding next state information is selected from the associated memory 222.

For example, the state codes for the nodes in the exemplary failure chain S6⇒S20⇒S23⇒S14⇒S0, which are depicted above in FIG. 7A, are stored in the TCAM according to prefix length, as summarized in Table 720 of FIG. 7B. More specifically, as indicated in FIG. 7B, the code for S6 (which is the highest-level node in the failure chain at level L=4) has the longest prefix of all the nodes in the failure chain and is therefore stored at the lowest CAM address ADDR=0, the code for S6's parent S20 has the next longest prefix of all the nodes in the failure chain and is stored at the next lowest CAM ADDR=1, and so on, with the entry for the root node S0 stored at the highest CAM address ADDR=4. For one example, if a state machine implementing string search operations according to the search tree 100B provides a search key including a current state value of "$P_1P_2P_3P_4$" to the TCAM depicted in FIG. 7B, which matches the TCAM entries for all nodes in the failure chain S6⇒S20⇒S23⇒S14⇒S0, the entry for S6 is selected as the longest prefix match from the TCAM (e.g., because it has the lowest CAM address of all matching entries), and the next state information for S6 is retrieved from the associated memory (not shown for simplicity). For another example, if a state machine implementing string search operations according to the search tree 100B provides a search key including a current state value of "$P_1P_2P_xP_y$" to the TCAM depicted in FIG. 7B, which matches the TCAM entries for nodes S0 and S14 in the failure chain S6⇒S20⇒S23⇒S14⇒S0, the entry for S14 is selected as the longest prefix match from the TCAM (e.g., because it has the lowest CAM address of all matching entries), and the next state information for S14 is retrieved from the associated memory.

Thus, once the states of a search tree are assigned unique state codes of varying prefix length, for example, by constructing a failure tree embodying the failure chains of the search tree and using the failure tree to generate state codes having a desired prefix property in accordance with embodiments of the present invention, the assigned state codes are combined with input character values indicative of corresponding goto transitions of the search tree to form a plurality of state entries that are stored in the TCAM device 221, and next state and result information are stored in corresponding locations of the associated SRAM 222. Thereafter, string search operations can be performed in a manner similar to that described above with respect to FIG. 4.

Figure 8:
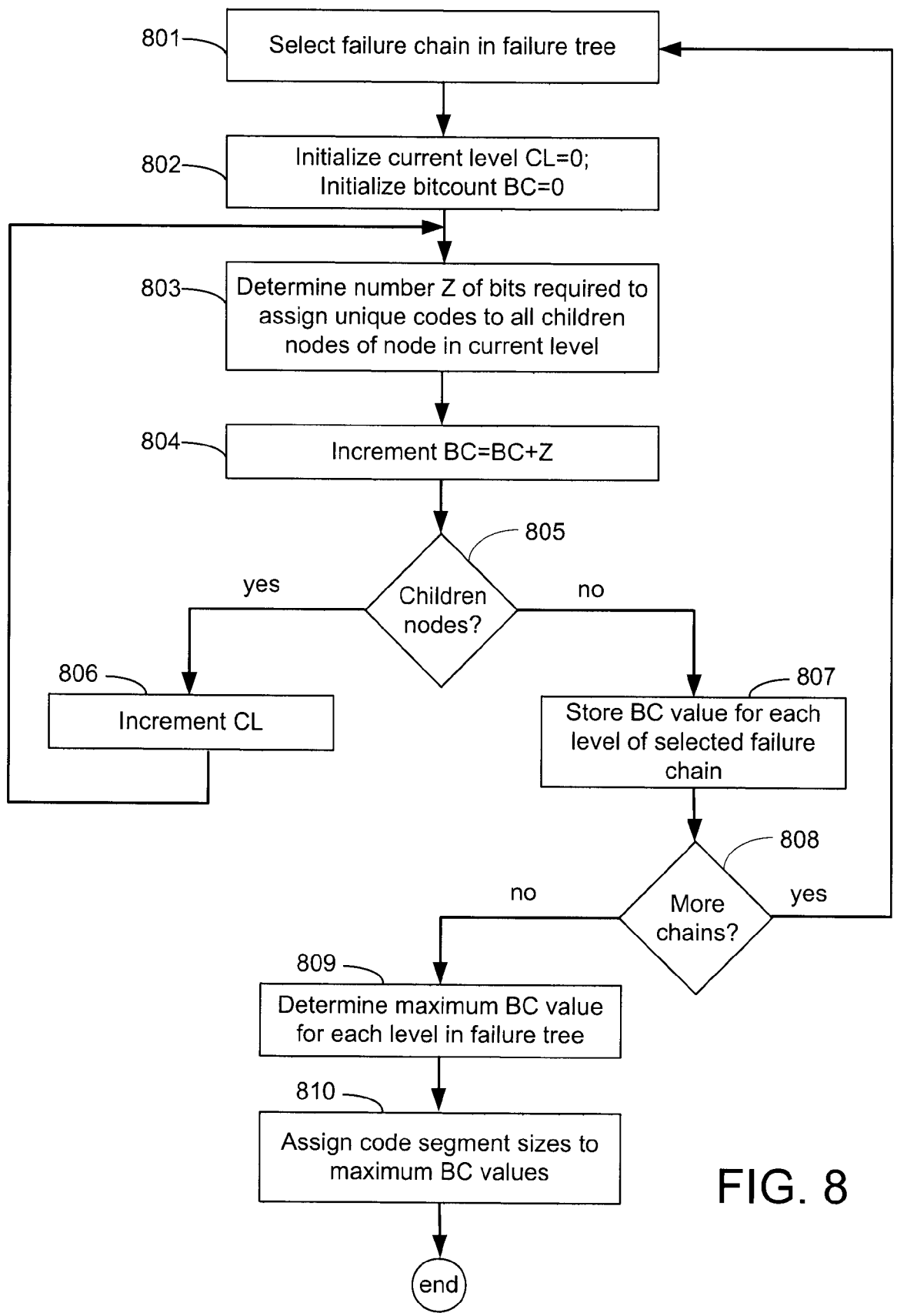
FIG. 8 shows an illustrative flow chart depicting an exemplary operation for determining the size of the TCAM current state fields for a search tree in accordance with some embodiments of the present invention.

For some embodiments, the number of bits necessary to uniquely encode all the nodes of the failure tree and to maintain the desired prefix property between all nodes in the same failure chain can be determined in a heuristic manner, as described below with respect to the illustrative flow chart of FIG. 8. First, a failure chain in the failure tree is selected (step 801), and a current level value (CL) and a bitcount value (BC) are initialized to zero (step 802). The current level value CL selects the current node level in the failure tree, and the bitcount value BC maintains the total number of bits required to assign unique codes to all the nodes in the failure tree during examination of the selected failure chain.

Next, the number of bits (Z) required to assign unique codes to all the children nodes of the node in the current level is determined as $Z=\log_2(N+1)$, where N is the number of children nodes (step 803). For example, taking the failure chain S6⇒S20⇒S23⇒S14⇒S0 and starting with L=0, there are 18 children nodes of node S0 at level L=0, and thus the number of bits required to assign unique codes to all children nodes of S0 is $Z=\log_2(18+1)=\log_2 19=5$ bits. Note that when determining how many bits are required to represent the states in a level, the number of nodes is incremented by 1 to include the parent node so that when codes are assigned to all the nodes, an extra code bit is reserved to distinguish the parent node from its children nodes. For some embodiments, the children nodes can be assigned codes with a varying number of bits, for example, using well-known Huffman codes. For one such embodiment, the weights for the Huffman codes assigned to the children nodes can be the height of the node from the leaf of the tree. For example, taking the failure chain S6⇒S20⇒S23⇒S14⇒S0, the leaf node S6 has a height of 1, its parent node S20 has a height of 2, its parent node S23 has a height of 3, and so on.

Then, the bitcount BC is incremented by Z, where BC=BC+Z (step 804). If there are any children nodes in the selected failure chain, as tested at step 805, the current level value (CL) is incremented (step 806), and processing continues at step 803. For example, node S14 has one child node S23, which requires $Z=\log_2(1+1)=\log_2 2=1$ additional bit. Similarly, repeating steps 803-806 for the remainder of the selected failure chain S6⇒S20⇒S23⇒S14⇒S0, S23 has two children nodes S20 and S4, which require $Z=\log_2(2+1)=\log_2 3=2$ additional bits, and node S20 has one child node S6, which requires $Z=\log_2(1+1)=\log_2 2=1$ additional bit.

Conversely, if there are no children nodes, at tested at step 805, the number of bits required (BC) for each level of the selected failure chain is stored in a memory element such as a register or bitmap (step 807). The number of bits required for each node level, as calculated using the failure chain S6⇒S20⇒S23⇒S14⇒S0, is summarized below in Table 2.

TABLE 2

| node level | number of bits |
|---|---|
| 1 | 5 |
| 2 | 1 |
| 3 | 2 |
| 4 | 1 |
| total | 9 |

Then, if there are additional failure chains in the failure tree, as tested at step 808, another failure chain is selected (step 801), and steps 802-807 are repeated for the next selected failure chain. For example, taking the failure chain S13⇒S15⇒S0 as the next selected failure chain, S0 has 18 children nodes, which as described above requires 5 code bits. Node S15 has 1 child node S13, which requires 1 additional bit. Because node S13 has no children, bit calculations are not performed for node levels L>2 for this failure chain, and thus the total number of bits required for the assignment of unique codes to all nodes, as calculated using the failure chain S13⇒S15⇒S0, is 5+1=6 bits, as summarized below in Table 3.

TABLE 3

| node level | number of bits |
|---|---|
| 1 | 5 |
| 2 | 1 |
| 3 | 0 |
| 4 | 0 |
| total | 6 |

Conversely, if there are no more failure chains in the failure tree, as tested at step 808, the maximum bitcount value BC for each node level in the failure tree, as determined for each failure chain, is determined (step 809). For the failure tree 600, the maximum BC count value for each node level is equal to the number of bits required for each node level as calculated for the failure chain S6⇒S20⇒S23⇒S14⇒S0, as summarized above in Table 3, and thus the code length for the TCAM current state fields of the exemplary failure tree 600 of FIG. 6 is equal to 9 bits.

Then, each current state field segment of the TCAM entries is formatted to include the maximum number of bits required for a corresponding node level (step 810). Thus, for the present example, the current state field of the TCAM entries includes 4 segments SGMT1-SGMT4, where SGMT1 is assigned to store a prefix $P_1$ having BC(1)=5 bits, SGMT2 is assigned to store a prefix $P_2$ having BC(2)=1 bit, SGMT3 is assigned to store a prefix $P_3$ having BC(3)=2 bits, and SGMT4 is assigned to store a prefix $P_4$ having BC(4)=1 bit, as depicted by TCAM current state field entry 730 of FIG. 7D.

As mentioned above, by using a failure tree representative of the failure chains of a search tree, embodiments of the present invention can encode the state entries of the search tree to eliminate all next transitions using significantly less bits than required by previous techniques. For example, the encoding technique described above with respect to FIG. 8 requires only 9 bits to encode the TCAM current state fields for all states of search trees 100A-100C in a manner that eliminates individual TCAM state entries for all next transitions. In contrast, because the prior technique described above with respect to FIGS. 3D-3E requires 8 state encoded bits for each depth of next transitions to be eliminated, and because search tree 100C includes a next transition 131 to D=5 state S5, such prior techniques require at least $\log_2 N+8(D-1)=\log_2 24+8(5-1)=37$ state encoded bits for the current state fields of the TCAM entries. In this manner, embodiments of the present invention allow a TCAM of a given width to store state entries that embody search trees having significantly greater number of states, as compared to prior techniques.

Once the code length sizes of the current state field segments of the TCAM entries are calculated for the selected search tree using its derived failure tree, as described above with respect to FIG. 8, the nodes of the failure tree are assigned unique codes in a manner that maintains the desired prefix property indicative of the relationship between the nodes within each of the tree's failure chains. For some embodiments, the codes are assigned to the nodes of the failure tree in a wave beginning at the root node and ending at the highest level of the failure tree, and for each node level, a counter initialized to the binary equivalent of "1" can be used to assign unique prefixes to the nodes in the level in a sequential fashion.

Figure 9:
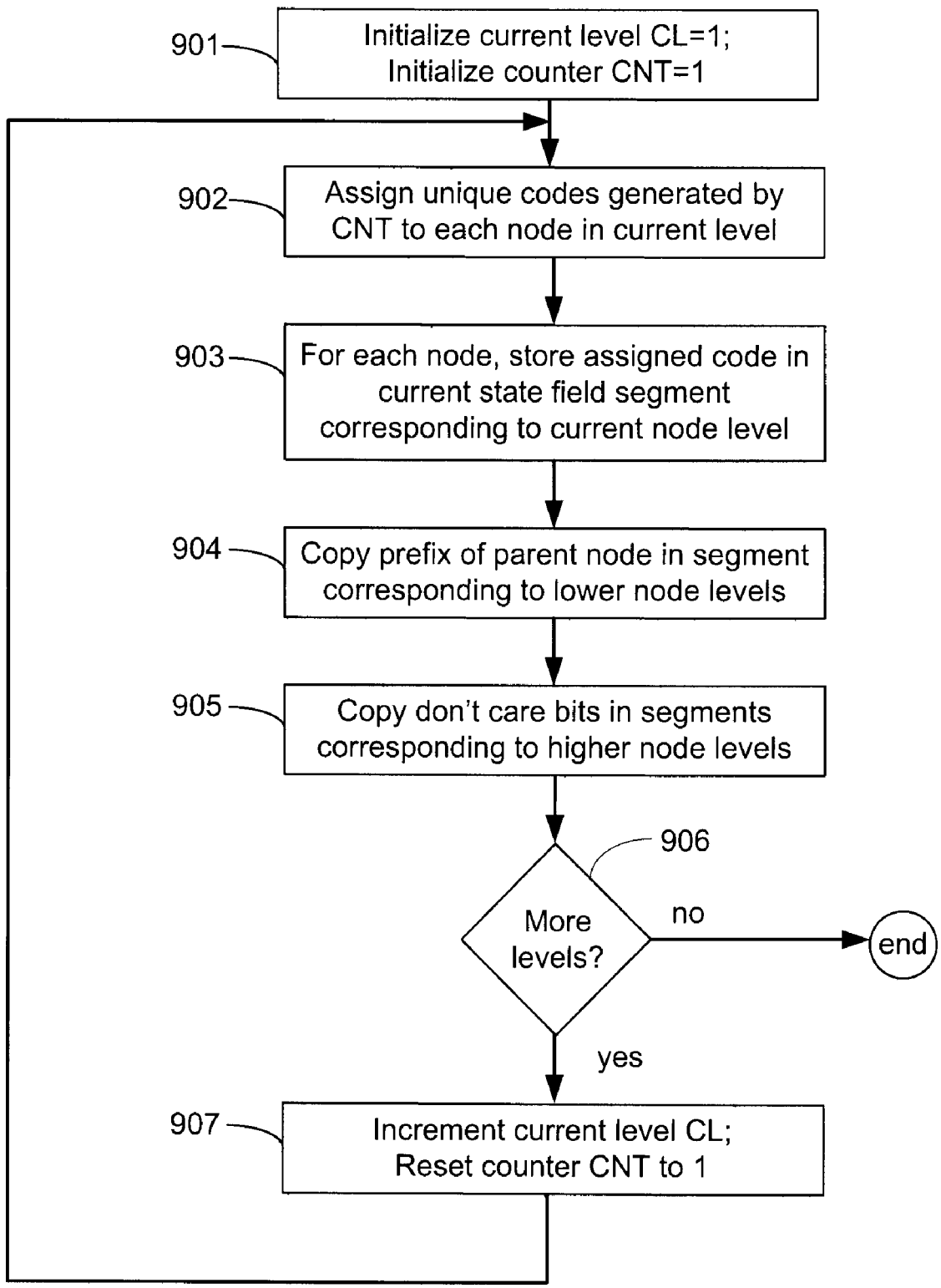
FIG. 9 shows an illustrative flow chart depicting an exemplary operation for assigning unique codes to the TCAM current state fields in accordance with some embodiments of the present invention.

Referring to the illustrative flow chart of FIG. 9, a current node level value (CL) is initialized to 1, and a counter value (CNT) is initialized to the binary equivalent of 1 (step 901). Then, for the current node level, the counter is used to assign unique codes for all the nodes in the current level indicated by CL, for example, by incrementing the counter for each node in the current level (step 902). Next, for each node, the assigned code is stored in the segment of the TCAM entry's current state field corresponding to the current level (step 903), the prefix code of the node's parent is stored in the current state field segment corresponding to lower node levels (step 904), and then ternary don't care bits are stored in the current state field segments corresponding to higher node levels (step 905).

Then, if there are more levels in the failure tree, as tested at step 906, the current level CL is incremented and the counter value CNT is reset to the binary equivalent of 1 (step 907), and processing continues for the next node level at step 902. Otherwise, if there are no more node levels in the failure tree, processing ends.

For example, for node level L=1 of the failure tree 600, which as mentioned above includes 18 nodes, the counter is used to assign unique BC(1)=5-bit codes to the L=1 nodes, and the assigned codes are stored in SGMT1 of the TCAM current state fields. For an exemplary embodiment, the unique codes can be the binary equivalents of numbers 1-18, for example, where node S1 is assigned a prefix $P_1$="00001," node S2 is assigned a prefix $P_1$="00010," node S3 is assigned a prefix $P_1$="00011," node S14 is assigned a prefix $P_1$="00100," node S15 is assigned a prefix $P_1$="00101," and so on. The remaining current state field segments SGMT2-SGMT4 for the level L=1 nodes are then set to don't care "*" values.

Next, selecting S14's child node S23, for which the corresponding segment SGMT2 includes BC(2)=1 bit, a binary value of "1" is stored in SGMT2 (step 903), the prefix of the parent node S14 "00100" is stored in SGMT1 corresponding to the lower node level (step 904), and ternary don't care values "*" are stored in all segments SGMT3-SGMT4 corresponding to higher node levels (step 905). Then, because S23 has 2 children nodes S4 and S20, BC(3)=2 bit codes are assigned to S4 and S20. For example, the code "01" can be assigned to SMGT3 of S4, and the code "10" can be assigned to SGMT3 of S20. The prefix of S23, which is "001001," is stored in SGMT1-SGMT2 of S4 and S20, and don't care bits "*" are stored in SGMT4 of S4 and S20.

This process is repeated for all nodes and node levels in the failure tree to create a prefix property between the nodes in each failure chain. For example, considering again the failure tree 600 of FIG. 6, the prefix property established between the nodes in the failure chain S6⇒S20⇒S23⇒S14⇒S0 is illustrated below in Table 4, the prefix property established between the nodes in the failure chain S12⇒S4⇒S23⇒S14⇒S0 is illustrated below in Table 5, and the prefix property established between the nodes in the failure chain S1⇒S0 is illustrated below in Table 6.

TABLE 4

| \multicolumn{5}{c}{failure chain S6 ⇒ S20 ⇒ S23 ⇒ S14 ⇒ S0} |
|---|---|---|---|---|
| node | SGMT1 | SGMT2 | SGMT3 | SGMT4 |
| 0 | ***** | * | ** | * |
| 14 | 00100 | * | ** | * |
| 23 | 00100 | 1 | ** | * |
| 20 | 00100 | 1 | 01 | * |
| 6 | 00100 | 1 | 01 | 1 |

TABLE 5

| \multicolumn{5}{c}{failure chain S12 ⇒ S4 ⇒ S23 ⇒ S14 ⇒ S0} |
|---|---|---|---|---|
| node | SGMT1 | SGMT2 | SGMT3 | SGMT4 |
| 0 | ***** | * | * | * |
| 14 | 00100 | * | ** | * |
| 23 | 00100 | 1 | ** | * |
| 4 | 00100 | 1 | 10 | * |
| 12 | 00100 | 1 | 10 | 1 |

TABLE 6

| \multicolumn{5}{c}{failure chain S1 ⇒ S0} |
|---|---|---|---|---|
| node | SGMT1 | SGMT2 | SGMT3 | SGMT4 |
| 0 | ***** | * | ** | * |
| 1 | 00001 | * | ** | * |

In this manner, the number of bits required to encode the states of a search tree is not related to or dependent upon the depth of the next transitions to be eliminated, which allows embodiments of the present invention to encode the states of a search tree in a manner that eliminates all next transitions and that requires significantly fewer TCAM entry bits than prior state encoding techniques allow.

Further, for some embodiments of the present invention, when storing next state information in the associated SRAM 222, any ternary don't care bits "*" within the assigned TCAM state codes are changed to binary "0." The next state code for a child node (e.g., as stored in the associated memory or SRAM 222) is distinguishable from the next state code of its parent node by reserving the binary value "0" of the least significant bit in the corresponding state code field segment for the parent node, for example, as described above by initializing the counter value CNT to the binary equivalent of "1" during code assignment operations for each node level of the failure tree. For one example, the assigned TCAM state code for S14 is "00100**", which is changed to a next state value of "001000000" for storage in the associated SRAM, and the assigned TCAM state code for S14's child S23 is "001001*", which is changed to a next state value of "001001000" for storage in the associated SRAM. Thus, the next state codes for S14 and S23 are distinguished in the SRAM by reserving a "0" value in the code's fourth bit location for the parent S14, and assigning a "1" value in the code's fourth bit location for the child S23.

As mentioned above, for some embodiments, the failure chains can be selected according to a maximum chain length (MCL) value. More specifically, as described above, if the maximum chain length is selected as MCL=3, the failure chain S6⇒S20⇒S23⇒S14⇒S0 can be represented as two separate chains S6⇒S20⇒S23 and S14⇒S0, and thus the resulting TCAM state entries require only MCL=3 segments (SGMT1-SGMT3) for storing the state codes. Exemplary state entries for the MCL=3 failure chains S6⇒S20⇒S23 and S14⇒S0 are shown below in Tables 7 and 8, respectively.

TABLE 7

| \multicolumn{4}{c}{failure chain S6 ⇒ S20 ⇒ S23} |
|---|---|---|---|
| node | SGMT1 | SGMT2 | SGMT3 |
| 23 | 00101 | ** | * |
| 4 | 00101 | 10 | * |
| 12 | 00101 | 10 | 1 |

TABLE 8

| \multicolumn{4}{c}{failure chain S14 ⇒ S0} |
|---|---|---|---|
| node | SGMT1 | SGMT2 | SGMT3 |
| 0 | ***** | ** | * |
| 14 | 00100 | ** | * |

By reducing the number of segments within the current state field of the TCAM state entries (i.e., and therefore reducing the number of bits of each TCAM state entry), less TCAM cells are required, which in turn can reduce power consumption. Further, note that the steps described above with respect to the exemplary flow charts of FIGS. 8 and 9 can be performed by the optimization engine 410 of FIG. 4, or alternatively by another suitable hardware-based or software-based technique.

For other embodiments, the number of bits necessary to uniquely encode all the nodes of the failure tree and to maintain the desired prefix property between all nodes in the same failure chain can be determined using an optimized technique that uses multiple passes through the failure tree to more efficiently allocate the state encoding bits to the states of the failure tree. For still other embodiments, a various encoding techniques can be combined in accordance with the present invention.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for representing a plurality of states of a goto-failure tree embodying a number of signatures to be searched for in an input string, the goto-failure tree including a plurality of branches of sequential states originating at a root node and connected by a number of goto transitions, wherein each non-root state is further connected to a corresponding fail state by a failure transition, the method comprising:
   identifying each sequence of states in the goto-failure tree that are connected by a chain of failure transitions; and
   encoding the states in response to the identifying to generate a plurality of unique state codes.

2. The method of claim 1, wherein the state codes do not embody any of the goto transitions.

3. The method of claim 1, wherein the state codes are generated independently of the goto transitions.

4. The method of claim 1, further comprising:
   selecting a maximum chain length (MCL) value; and
   limiting the number of states in each failure chain to the selected MCL value.

5. The method of claim 1, wherein the encoding comprises:
   determining a minimum number of bits required to encode all the states of the goto-failure tree; and
   assigning the state codes according to the failure chains, wherein the state codes have varying prefix lengths.

6. The method of claim 5, wherein for each failure chain, the state codes of states at higher levels of the failure chain have longer prefixes than the state codes of states at lower levels of the failure chain.

7. The method of claim 6, wherein for each failure chain, the state codes assigned to all the non-root states in the failure chain share a common prefix.

8. The method of claim 5, wherein for each failure chain, the state code for each state in the failure chain comprises a prefix that is common to the state codes for all higher level states in the failure chain and that is different from the state codes for states in other failure chains.

9. The method of claim 1, wherein the failure chains are embodied by a failure tree that includes all the states of the goto-failure tree re-organized in a plurality of depth levels according to the number of failure transitions between each state and the root node.

10. The method of claim 9, wherein the determining comprises:
    selecting one of the failure chains;
    for each level of the selected failure chain, determining a number N of bits required to represent all children states; and
    summing the N values for all the levels.

11. The method of claim 9, wherein each state code includes a plurality of segments, each segment associated with a corresponding level of the failure tree.

12. The method of claim 11, wherein the assigning comprises:
    selecting a level of the failure tree;
    assigning a unique prefix to each state in the selected level; and
    for each state in the selected level, storing the assigned unique prefix in the segment corresponding to the selected level.

13. The method of claim 12, wherein the assigning further comprises:
    selecting one of the failure chains; and
    for each state in the selected failure chain:
       copying the prefix of a parent state in segments of the state code corresponding to lower levels of the failure tree; and
       copying ternary don't care bits in segments of the state code corresponding to higher levels of the failure tree.

14. The method of claim 12, wherein the prefixes comprise Huffman codes.

15. The method of claim 1, further comprising:
    constructing a failure tree that includes all the states of the goto-failure tree re-organized in a plurality of depth levels according to the number of failure transitions between each state and the root node.

16. The method of claim 15, wherein for any one of the failure chains, the state code for each state comprises a first prefix portion that is common to all higher-level states in the failure chain and comprises a second prefix portion that is unique to the second prefix portions of subsequent states in the failure chain.

17. An optimization engine for representing a plurality of states of a goto-failure tree embodying a number of signatures to be searched for in an input string, the goto-failure tree including a plurality of branches of sequential states originating at a root node and connected by a number of goto transitions, wherein each non-root state is further connected to a corresponding fail state by a failure transition, the engine comprising:
    means for identifying each sequence of states in the goto-failure tree that are connected by a chain of failure transitions; and
    means for encoding the states in response to the identifying to generate a plurality of unique state codes.

18. The engine of claim 17, wherein the state codes do not embody any of the goto transitions.

19. The engine of claim 17, wherein the state codes are generated independently of the goto transitions.

20. The engine of claim 17, further comprising:
    means for selecting a maximum chain length (MCL) value; and
    means for limiting the number of states in each failure chain to the selected MCL value.

21. The engine of claim 17, wherein the means for encoding comprises:

means for determining a minimum number of bits required to encode all the states of the goto-failure tree; and means for assigning the state codes according to the failure chains, wherein the state codes have varying prefix lengths.

22. The engine of claim 21, wherein for each failure chain, the state codes of states at higher levels of the failure chain have longer prefixes than the state codes of states at lower levels of the failure chain.

23. The engine of claim 22, wherein for each failure chain, the state codes assigned to all the non-root states in the failure chain share a common prefix.

24. The engine of claim 23, wherein for each failure chain, the state code for each state in the failure chain comprises a prefix that is common to the state codes for all higher level states in the failure chain and that is different from the state codes for states in other failure chains.

25. The engine of claim 17, wherein the failure chains are embodied by a failure tree that includes all the states of the goto-failure tree re-organized in a plurality of depth levels according to the number of failure transitions between each state and the root node.

26. The engine of claim 25, wherein the means for determining comprises:

means for selecting one of the failure chains;

for each level of the selected failure chain, means for determining a number N of bits required to represent all children states; and means for summing the N values for all the levels.

27. The engine of claim 25, wherein each state code includes a plurality of segments, each segment associated with a corresponding level of the failure tree.

28. The engine of claim 27, wherein the means for assigning comprises:

means for selecting a level of the failure tree;

means for assigning a unique prefix to each state in the selected level; and for each state in the selected level, means for storing the assigned unique prefix in the segment corresponding to the selected level.

29. The engine of claim 28, wherein the means for assigning further comprises:

means for selecting one of the failure chains; and for each state in the selected failure chain:

means for copying the prefix of a parent state in segments of the state code corresponding to lower levels of the failure tree; and means for copying ternary don't care bits in segments of the state code corresponding to higher levels of the failure tree.

30. The engine of claim 28, wherein the prefixes comprise Huffman codes.

31. The engine of claim 17, further comprising:

means for constructing a failure tree that includes all the states of the goto-failure tree re-organized in a plurality of depth levels according to the number of failure transitions between each state and the root node.

32. The engine of claim 31, wherein for any one of the failure chains, the state code for each state comprises a first prefix portion that is common to all higher-level states in the failure chain and comprises a second prefix portion that is unique to the second prefix portions of subsequent states in the failure chain.

* * * * *